(12) United States Patent
Rivera

(10) Patent No.: US 9,572,452 B2
(45) Date of Patent: Feb. 21, 2017

(54) SINGLE SERVING BREWING MATERIAL ADAPTER WITH READABLE LABEL

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 319 days.

(21) Appl. No.: 14/247,204

(22) Filed: Apr. 7, 2014

(65) Prior Publication Data

US 2014/0290493 A1 Oct. 2, 2014

Related U.S. Application Data

(63) Continuation-in-part of application No. 12/960,496, filed on Dec. 4, 2010.

(51) Int. Cl.

| | |
|---|---|
| *A47J 31/00* | (2006.01) |
| *A47J 31/40* | (2006.01) |
| *A47J 31/36* | (2006.01) |
| *A47J 31/08* | (2006.01) |
| *B65B 29/02* | (2006.01) |
| *B65B 67/02* | (2006.01) |
| *B65D 85/804* | (2006.01) |
| *A47J 31/06* | (2006.01) |
| *A47J 31/44* | (2006.01) |

(52) U.S. Cl.
CPC ............. *A47J 31/407* (2013.01); *A47J 31/061* (2013.01); *A47J 31/0631* (2013.01); *A47J 31/0663* (2013.01); *A47J 31/0689* (2013.01); *A47J 31/085* (2013.01); *A47J 31/3623* (2013.01); *A47J 31/3628* (2013.01); *A47J 31/3671* (2013.01); *A47J 31/3676* (2013.01); *A47J 31/3695* (2013.01); *A47J 31/4403* (2013.01); *A47J 31/4492* (2013.01); *B65B 29/02* (2013.01); *B65B 67/02* (2013.01); *B65D 85/8046* (2013.01); *B65D 2203/10* (2013.01)

(58) Field of Classification Search
CPC A47J 31/3628; A47J 31/3633; A47J 31/3623; A47J 31/3676
USPC .................................................... 99/295, 323
See application file for complete search history.

(56) References Cited

U.S. PATENT DOCUMENTS

| | | | |
|---|---|---|---|
| 2,433,815 | A | 12/1947 | Nicephore et al. |
| 3,022,411 | A | 2/1962 | Soper et al. |
| 3,115,822 | A | 12/1963 | Totten |
| 3,120,170 | A | 2/1964 | Garte |
| 3,136,241 | A | 6/1964 | Price |
| 3,199,682 | A | 8/1965 | Scholtz |

(Continued)

FOREIGN PATENT DOCUMENTS

WO WO 2005/092160 A1 10/2005

*Primary Examiner* — Reginald L Alexander
(74) *Attorney, Agent, or Firm* — Kenneth L. Green; Averill & Green

(57) ABSTRACT

An adapter for single serving cartridges includes a coffee maker readable identification feature. The identification feature may be visual (for example any feature which may be read or a bar code), a readable magnetic strip, a Radio Frequency Identification (RFID), or any feature able to contain information and provide that information to a reader. The adapter may be configured for known disposable single serving cartridges, and may include one or more needles to puncture the cartridges for use. The identification feature may inform the coffee maker that an adapter carrying a disposable single serving cartridge is in use, and adjust the coffee maker accordingly.

16 Claims, 33 Drawing Sheets

(56) References Cited

U.S. PATENT DOCUMENTS

| | | |
|---|---|---|
| 3,224,360 A | 12/1965 | Wickenberg et al. |
| 3,316,388 A | 4/1967 | Wickenbert et al. |
| 3,384,004 A | 5/1968 | Perlman et al. |
| 3,405,630 A | 10/1968 | Weber, III |
| 3,583,308 A | 6/1971 | Williams |
| 3,607,297 A | 9/1971 | Fasano |
| 3,757,670 A | 9/1973 | Laama et al. |
| 3,844,206 A | 10/1974 | Weber |
| 3,958,502 A | 5/1976 | Vitous |
| 4,253,385 A | 3/1981 | Illy |
| 4,286,515 A | 9/1981 | Baumann et al. |
| 4,603,621 A | 8/1986 | Roberts |
| 4,703,687 A | 11/1987 | Wei |
| 4,787,299 A * | 11/1988 | Levi .............. A47J 31/0657 99/285 |
| 4,800,089 A | 1/1989 | Scott |
| 4,998,463 A | 3/1991 | Precht et al. |
| 5,000,082 A | 3/1991 | Lassota |
| 5,012,629 A | 5/1991 | Rehman |
| 5,046,409 A | 9/1991 | Henn |
| 5,123,335 A | 6/1992 | Aselu |
| 5,171,457 A | 12/1992 | Acuff et al. |
| 5,233,914 A | 8/1993 | English |
| 5,325,765 A | 7/1994 | Sylvan et al. |
| 5,335,589 A | 8/1994 | Yerves et al. |
| 5,526,733 A | 6/1996 | Klawuhn et al. |
| 5,582,730 A | 12/1996 | Hugentobler |
| 5,636,563 A | 6/1997 | Oppermann et al. |
| 5,649,412 A | 7/1997 | Binacchi |
| 5,676,041 A | 10/1997 | Glucksman et al. |
| 5,829,340 A | 11/1998 | Yang |
| 5,840,189 A | 11/1998 | Sylvan et al. |
| 5,870,943 A | 2/1999 | Levi et al. |
| 5,895,672 A | 4/1999 | Cooper |
| 6,136,352 A | 10/2000 | Silverstein et al. |
| 6,189,438 B1 | 2/2001 | Bielfeldt et al. |
| D454,433 S | 3/2002 | Peter |
| D454,434 S | 3/2002 | McDaniel et al. |
| 6,440,256 B1 | 8/2002 | Gordon et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,708,600 B2 | 3/2004 | Winkler et al. |
| 6,727,484 B2 | 4/2004 | Policappelli |
| 6,740,345 B2 | 5/2004 | Cai |
| 6,777,007 B2 | 8/2004 | Cai |
| 6,832,542 B2 | 12/2004 | Hu et al. |
| 6,843,165 B2 | 1/2005 | Stoner |
| D502,362 S | 3/2005 | Lazaris et al. |
| 6,904,840 B1 | 6/2005 | Pfeifer et al. |
| 6,948,420 B2 | 9/2005 | Kirschner et al. |
| 7,047,870 B2 | 5/2006 | Gantt et al. |
| 7,081,263 B2 | 7/2006 | Albrecht |
| 7,131,369 B2 | 11/2006 | Gantt et al. |
| 7,320,274 B2 | 1/2008 | Castellani |
| 7,377,089 B2 | 5/2008 | Rapparini |
| 7,946,217 B2 | 5/2011 | Favre et al. |
| 8,047,127 B2 | 11/2011 | Lin |
| 8,479,639 B2 * | 7/2013 | Levin .............. A47J 31/005 426/433 |
| 8,720,320 B1 * | 5/2014 | Rivera ............ A47J 31/0678 99/295 |
| 8,857,317 B2 * | 10/2014 | Manser ............ A47J 31/407 99/289 R |
| 8,978,544 B2 * | 3/2015 | Leuzinger ........ A47J 31/3676 99/280 |
| 8,999,421 B2 * | 4/2015 | Clark .............. A47J 31/407 29/428 |
| 2002/0035929 A1 | 3/2002 | Kanba et al. |
| 2002/0148356 A1 | 10/2002 | Lazaris et al. |
| 2003/0200872 A1 | 10/2003 | Lin |
| 2004/0005384 A1 | 1/2004 | Cai |
| 2004/0118290 A1 | 6/2004 | Cai |
| 2005/0236323 A1 | 10/2005 | Oliver et al. |
| 2005/0257695 A1 | 11/2005 | Dobranski et al. |
| 2006/0159815 A1 | 7/2006 | Crook et al. |
| 2006/0174769 A1 | 8/2006 | Favre et al. |
| 2006/0196364 A1 | 9/2006 | Kirschner |
| 2007/0259074 A1 | 11/2007 | Searchilli et al. |
| 2009/0229471 A1 | 9/2009 | Lun et al. |
| 2010/0083843 A1 | 4/2010 | Denisart et al. |
| 2011/0209623 A1 | 9/2011 | Lueng et al. |
| 2011/0274802 A1 | 11/2011 | Rivera |
| 2012/0207895 A1 | 8/2012 | Rivera |
| 2012/0207896 A1 | 8/2012 | Rivera |
| 2012/0276264 A1 | 11/2012 | Rivera |
| 2012/0285330 A1 | 11/2012 | Demiglio et al. |
| 2012/0285334 A1 | 11/2012 | Demiglio et al. |
| 2014/0245895 A1 | 9/2014 | Demiglio et al. |

* cited by examiner

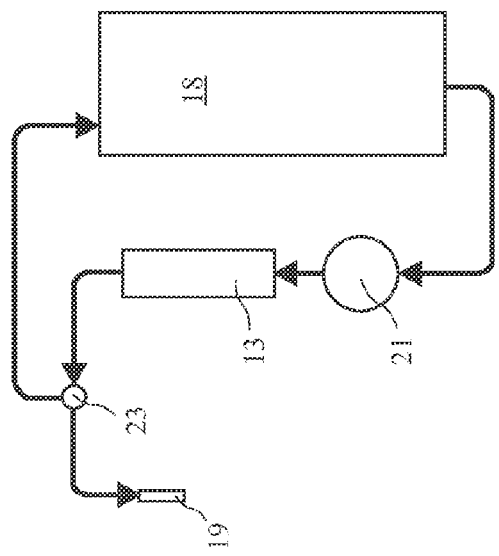
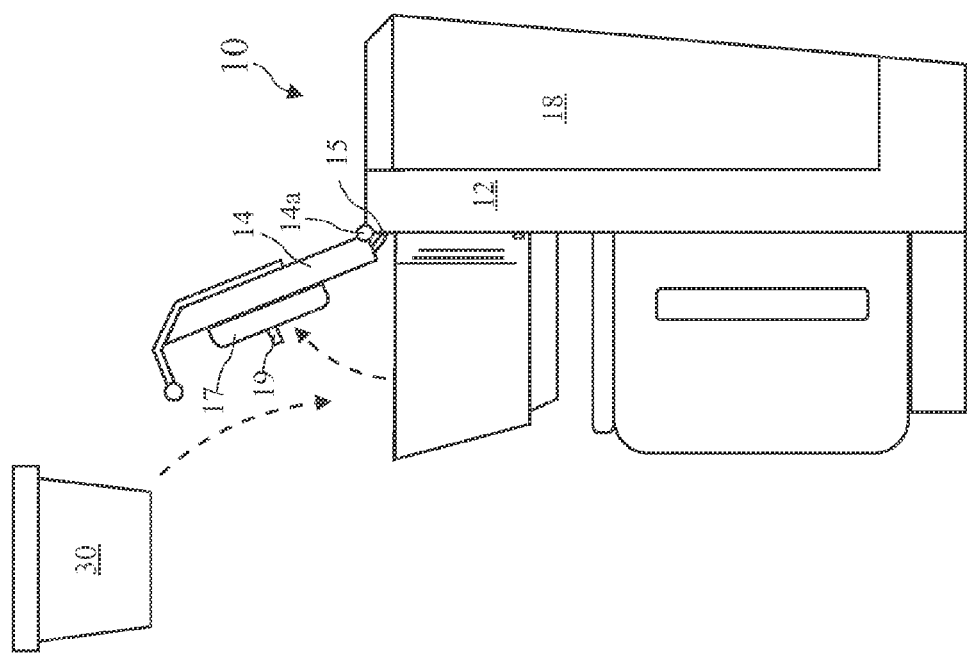

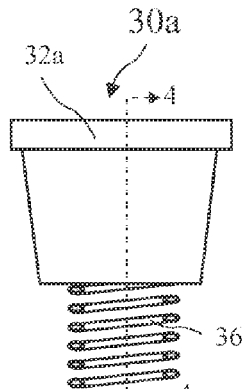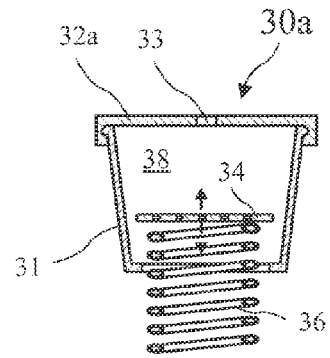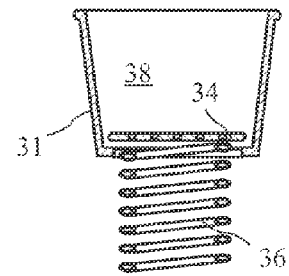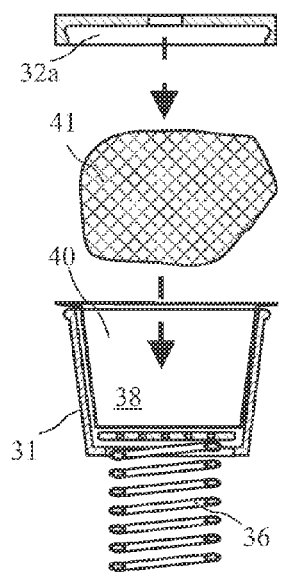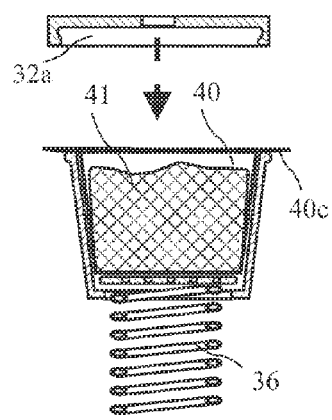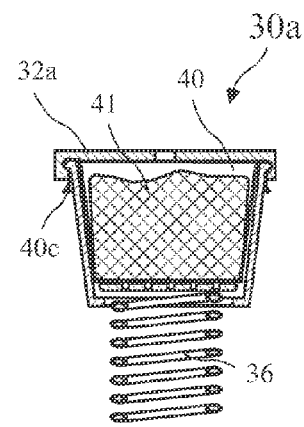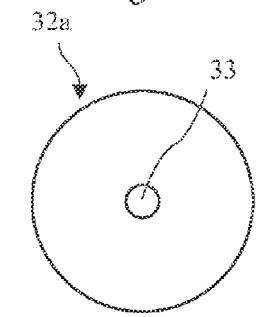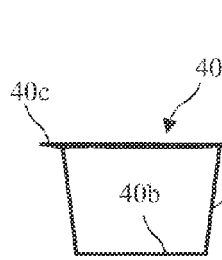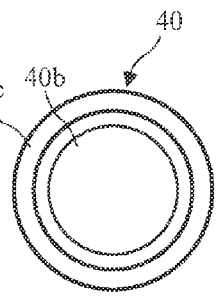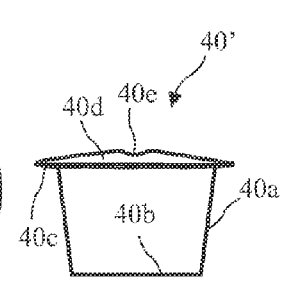

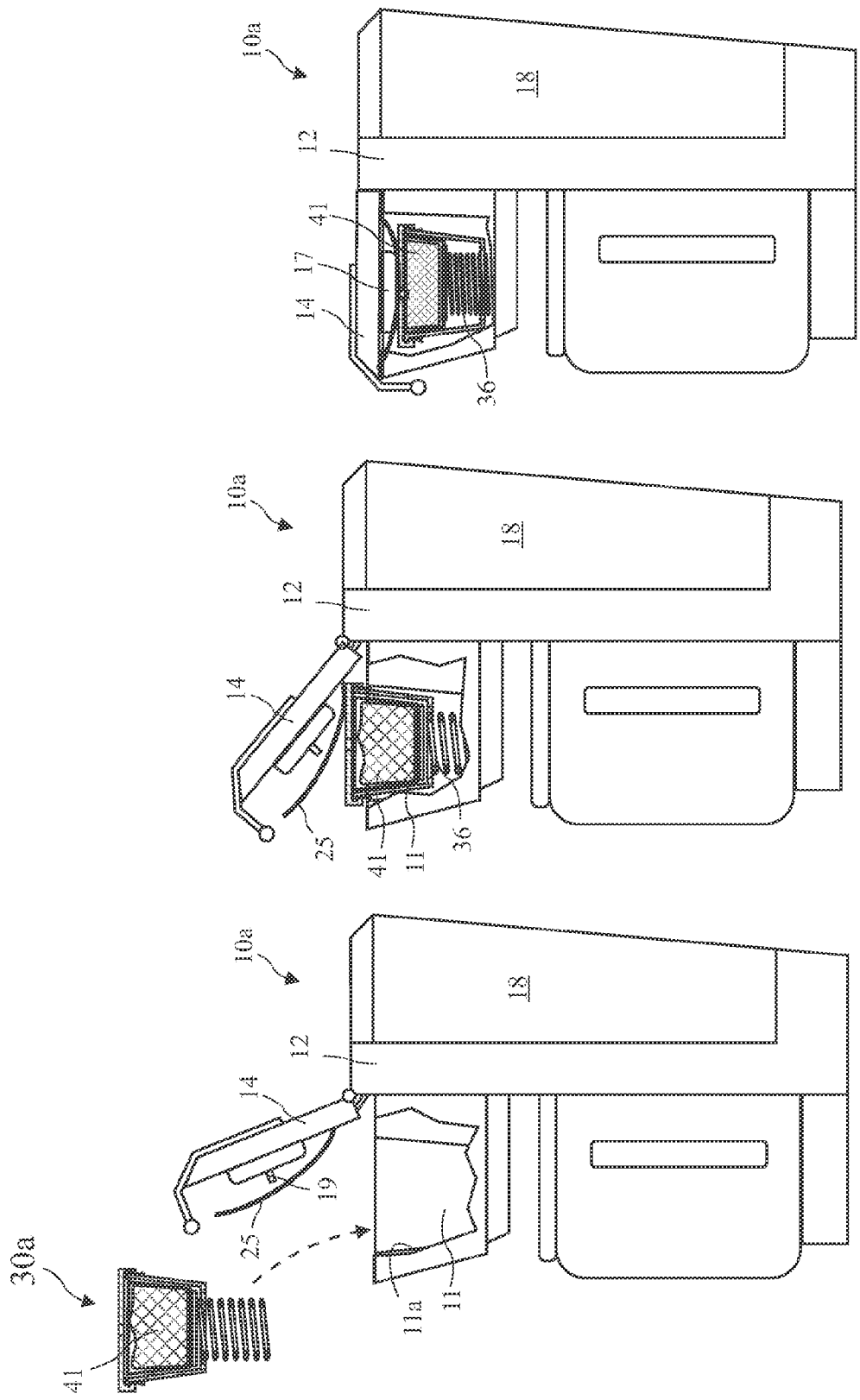

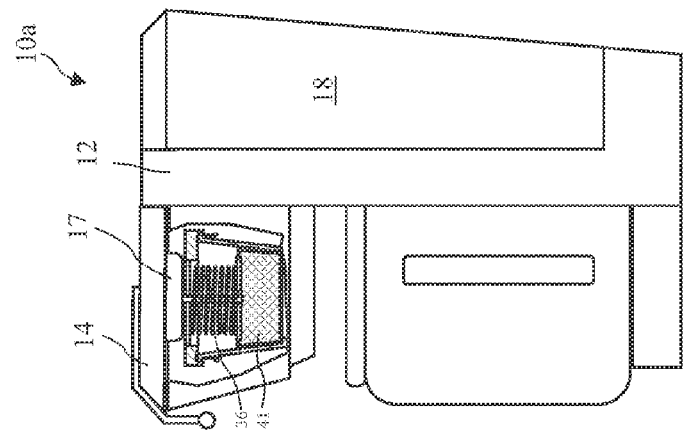
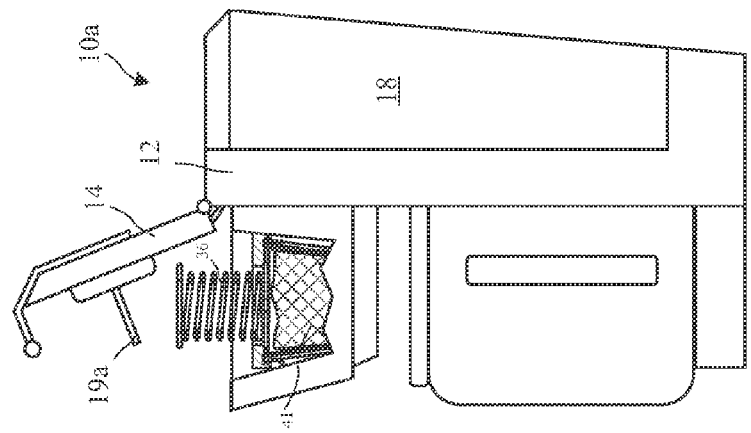
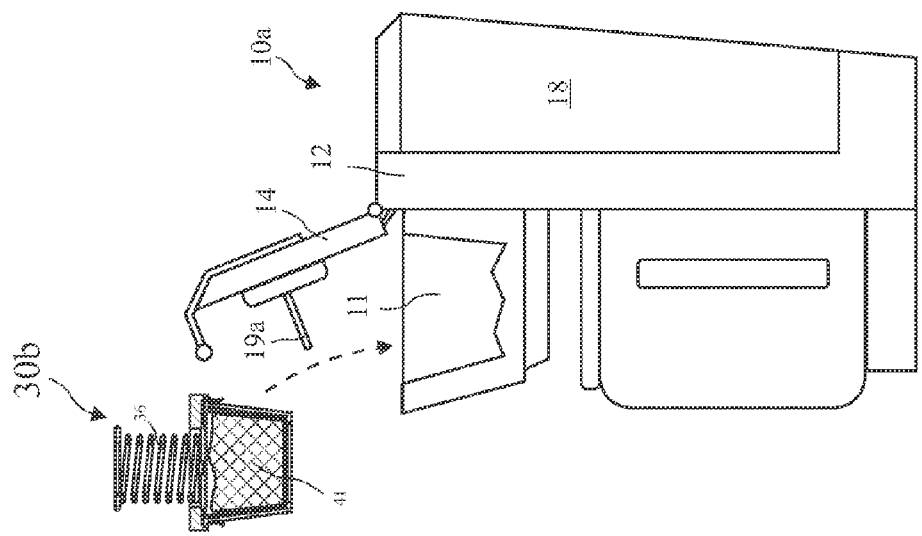

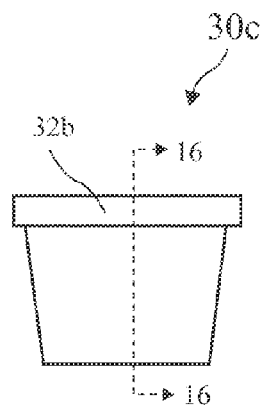
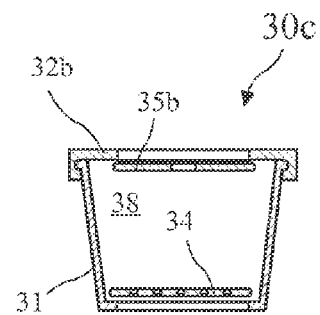
FIG. 15    FIG. 16
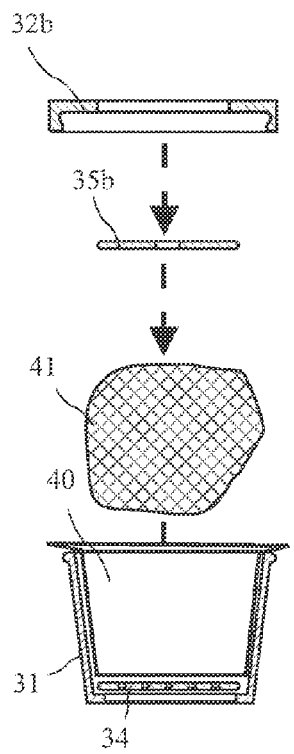
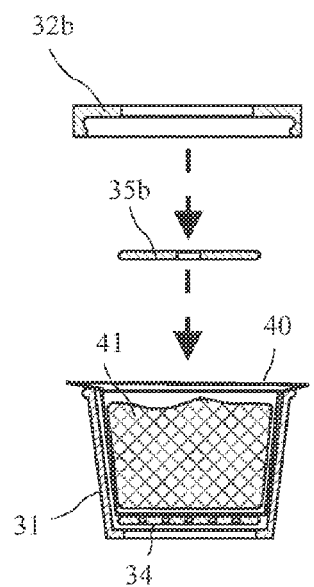
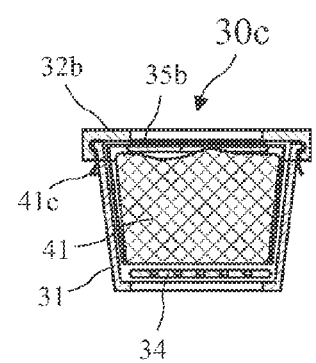
FIG. 17A    FIG. 17B    FIG. 17C

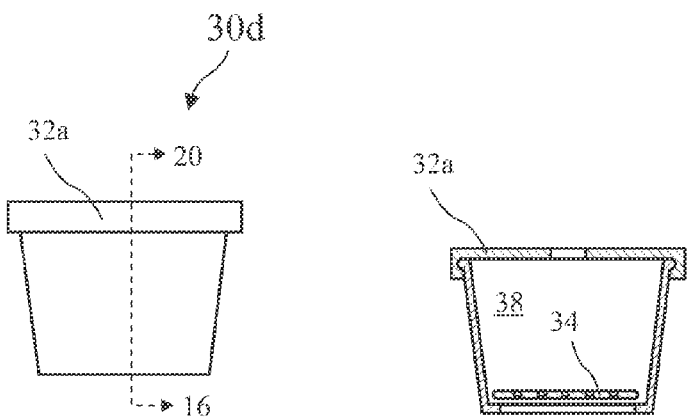
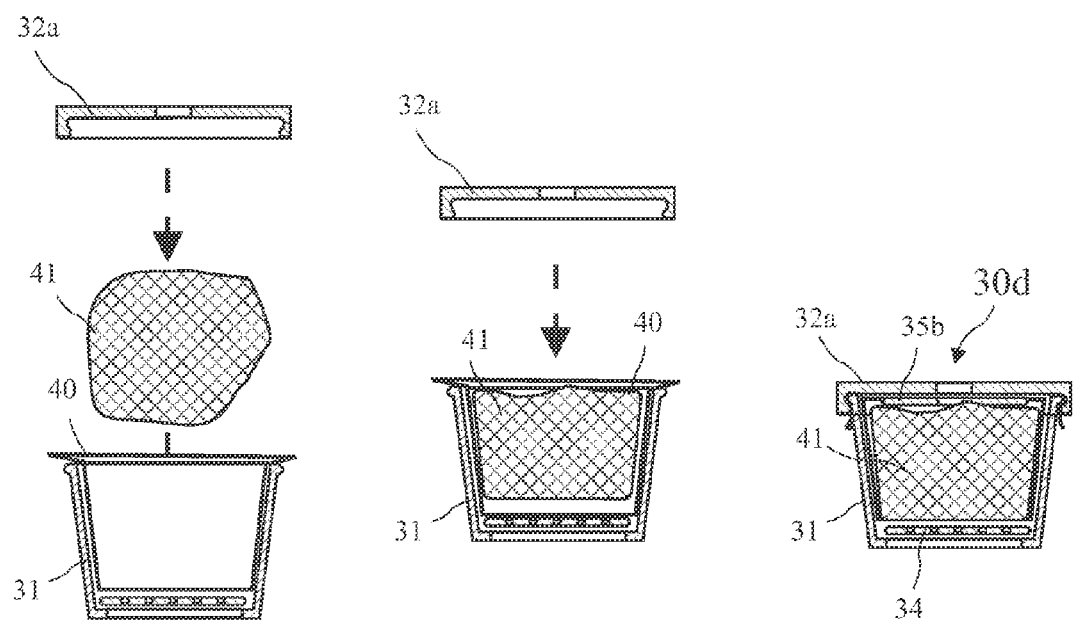
FIG. 19  FIG. 20
FIG. 21A  FIG. 21B  FIG. 21C

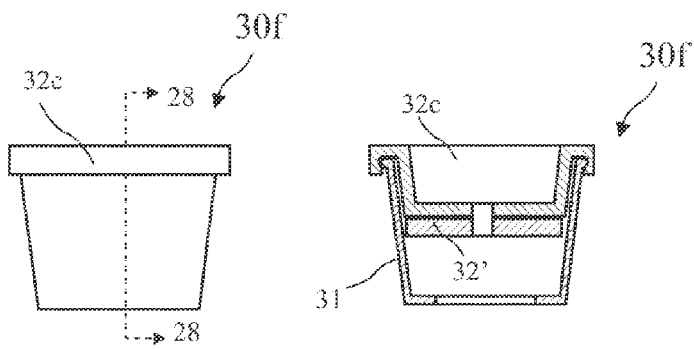
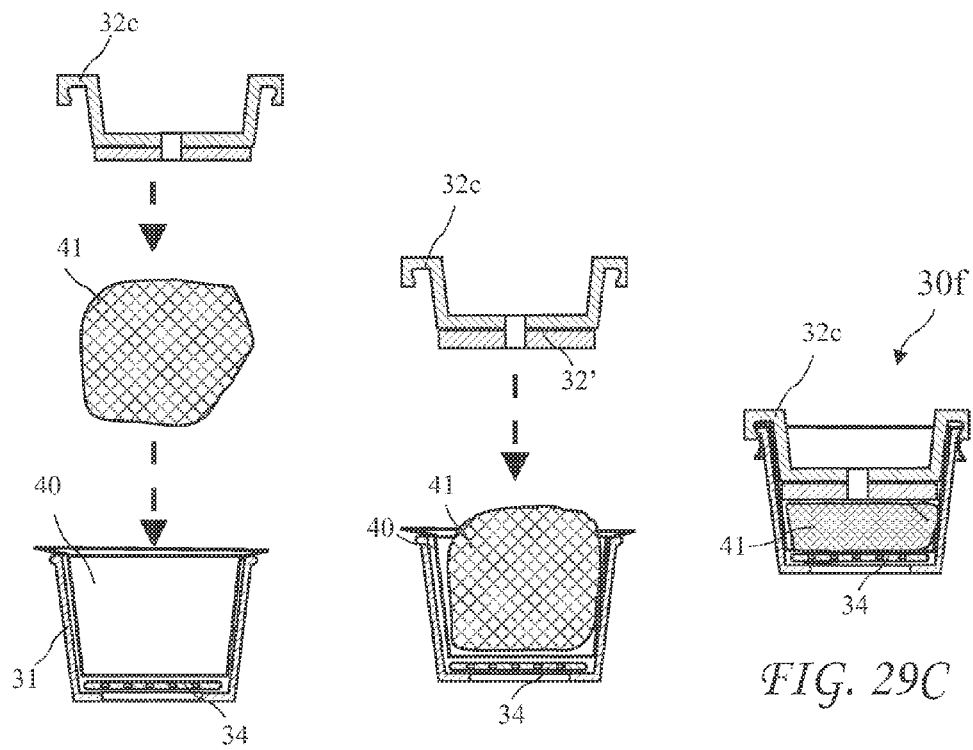
FIG. 27  FIG. 28
FIG. 29A  FIG. 29B  FIG. 29C

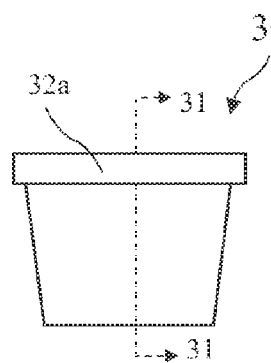
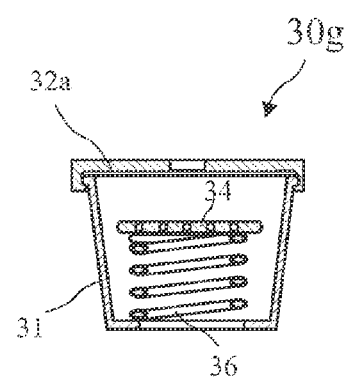
FIG. 30  FIG. 31
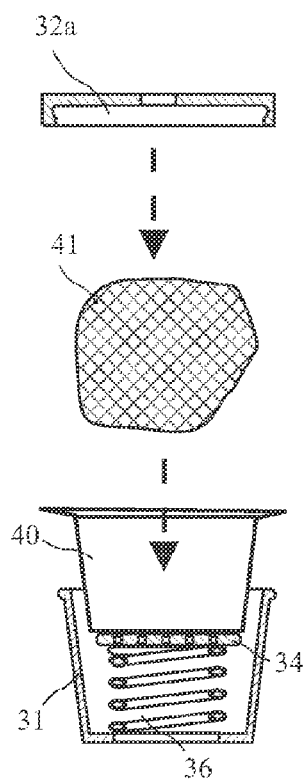
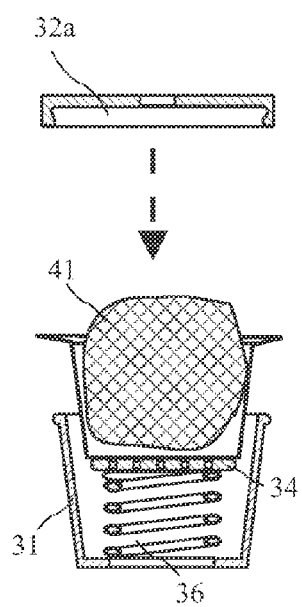
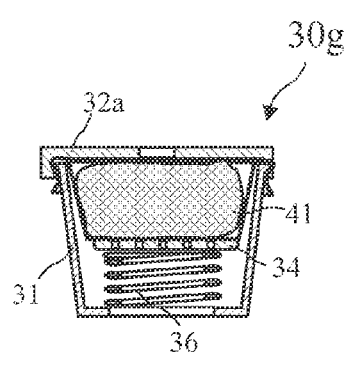
FIG. 32A  FIG. 32B  FIG. 32C

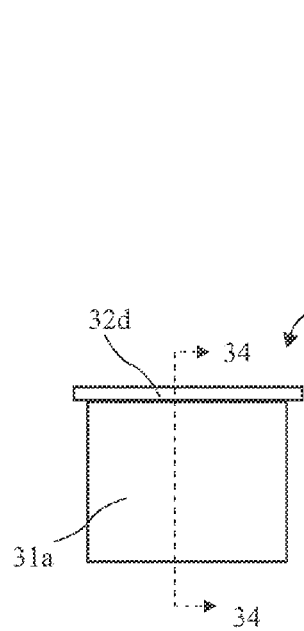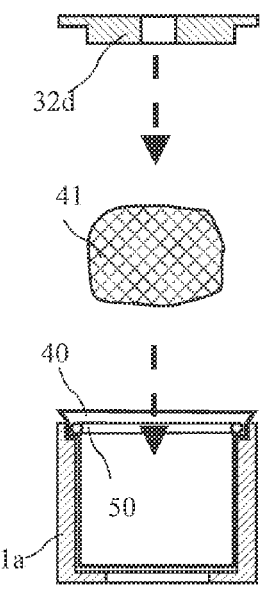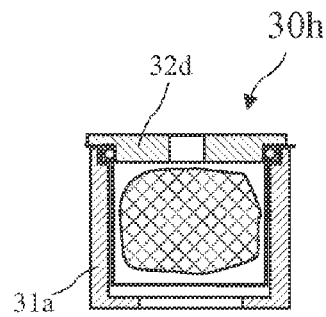
FIG. 33    FIG. 34A    FIG. 34B
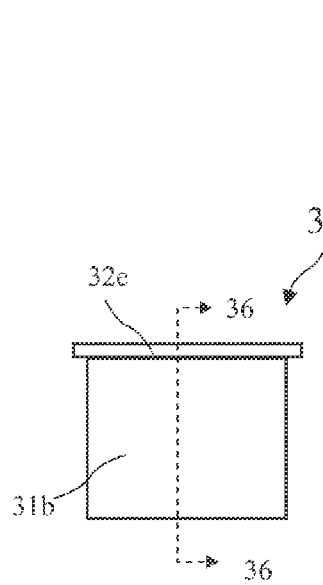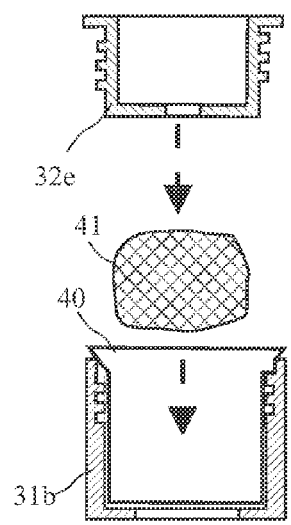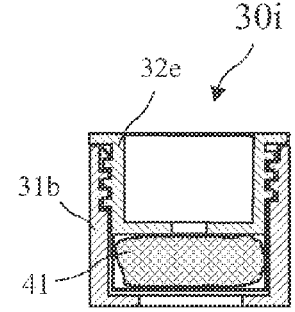
FIG. 35    FIG. 36A    FIG. 36B

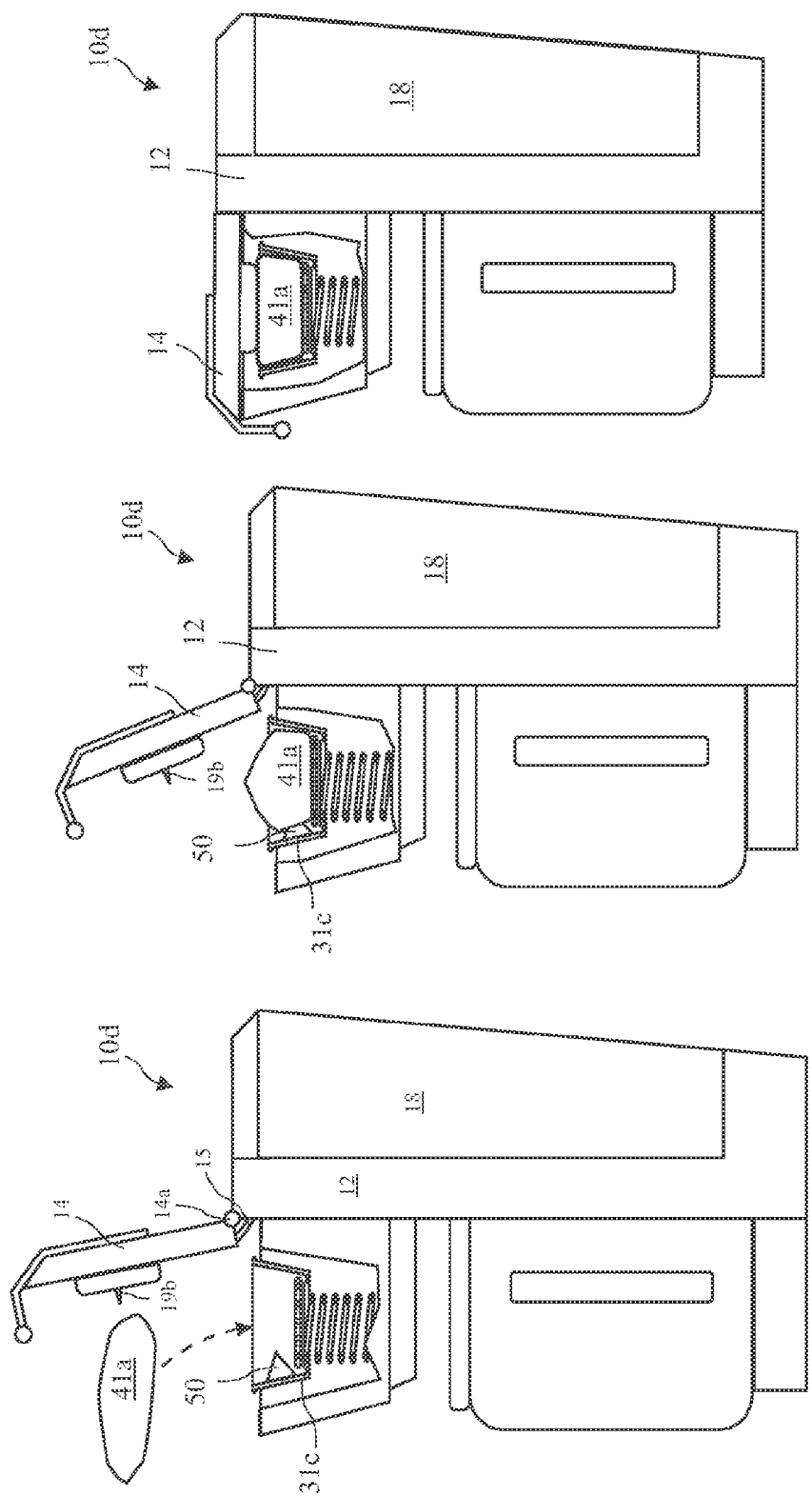

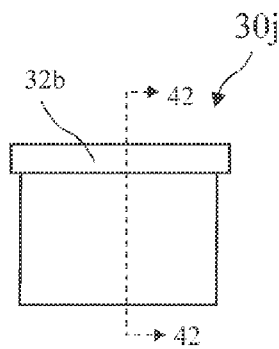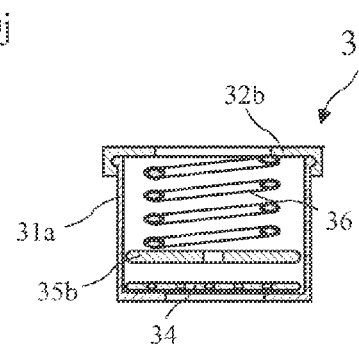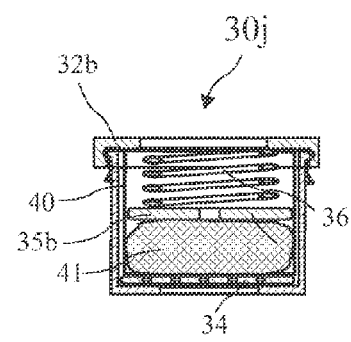
FIG. 41  FIG. 42  FIG. 43
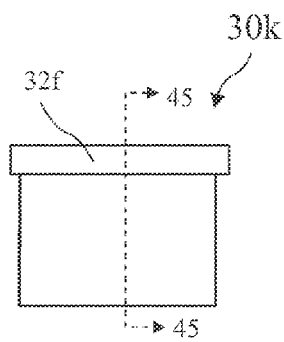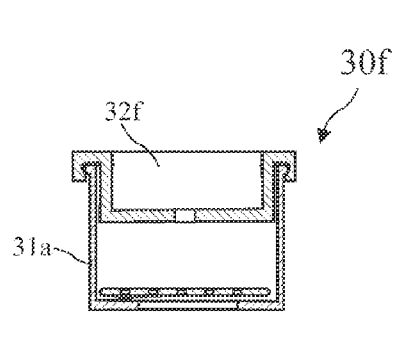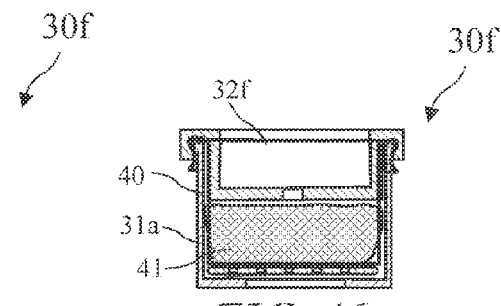
FIG. 44  FIG. 45  FIG. 46
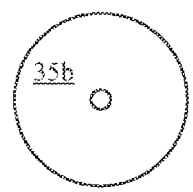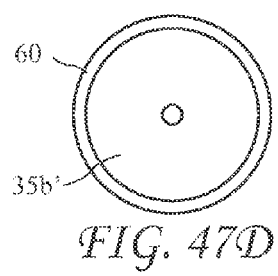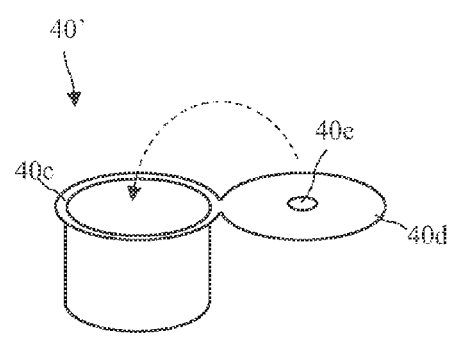
FIG. 47B  FIG. 47D  FIG. 48
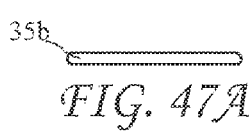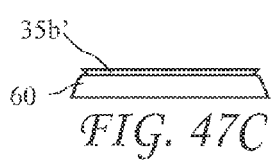
FIG. 47A  FIG. 47C

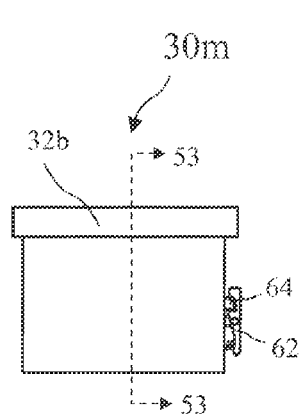
FIG. 52
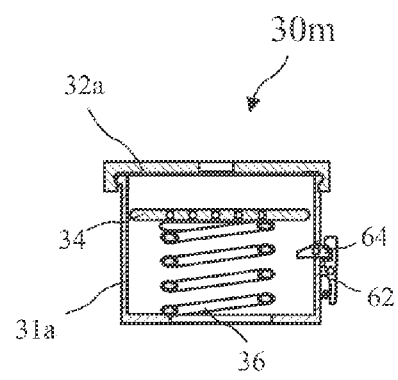
FIG. 53
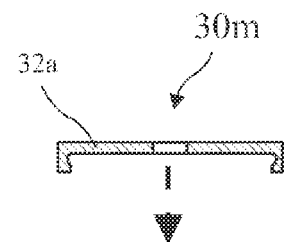
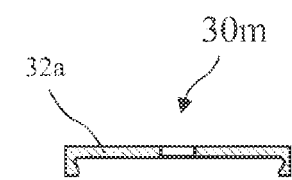
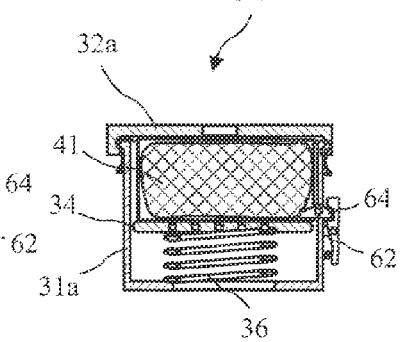
FIG. 54B   FIG. 54C
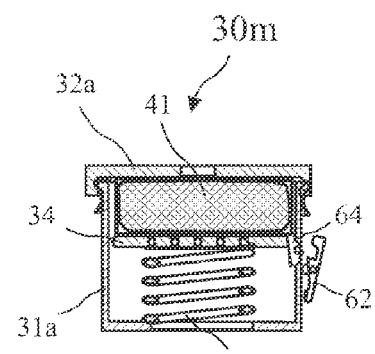
FIG. 54A
FIG. 54D

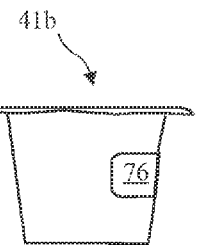
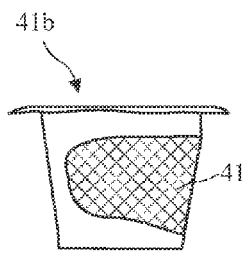
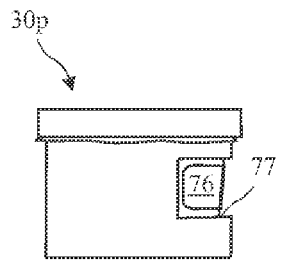
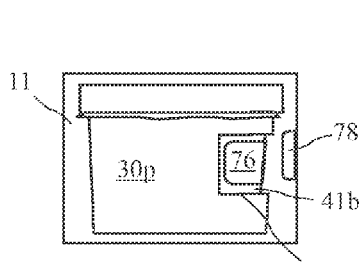
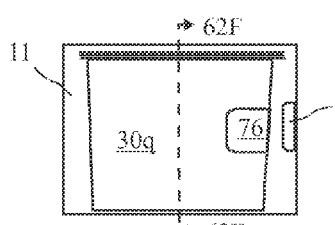
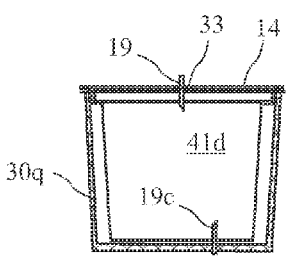
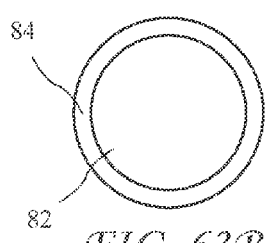
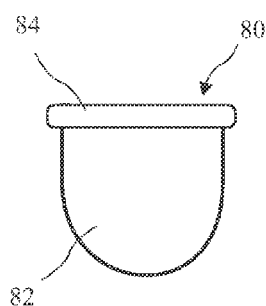
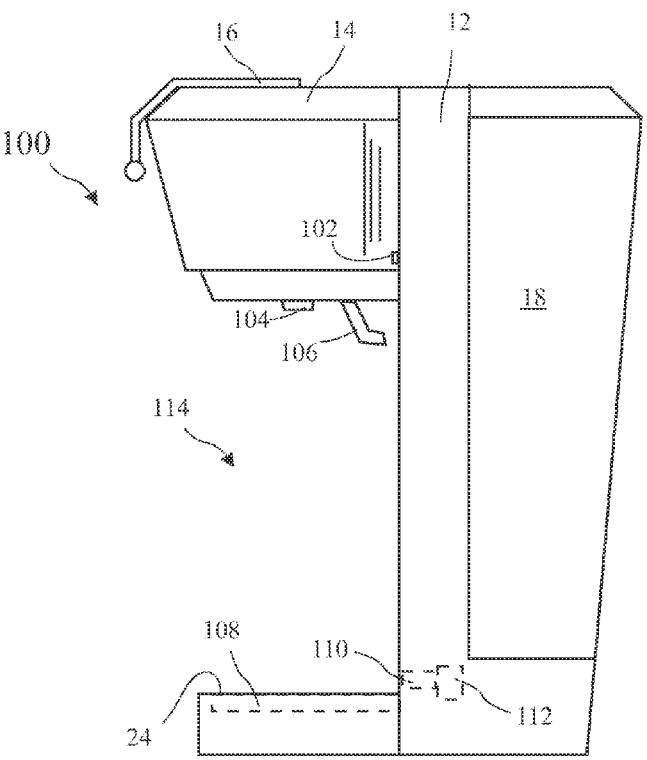

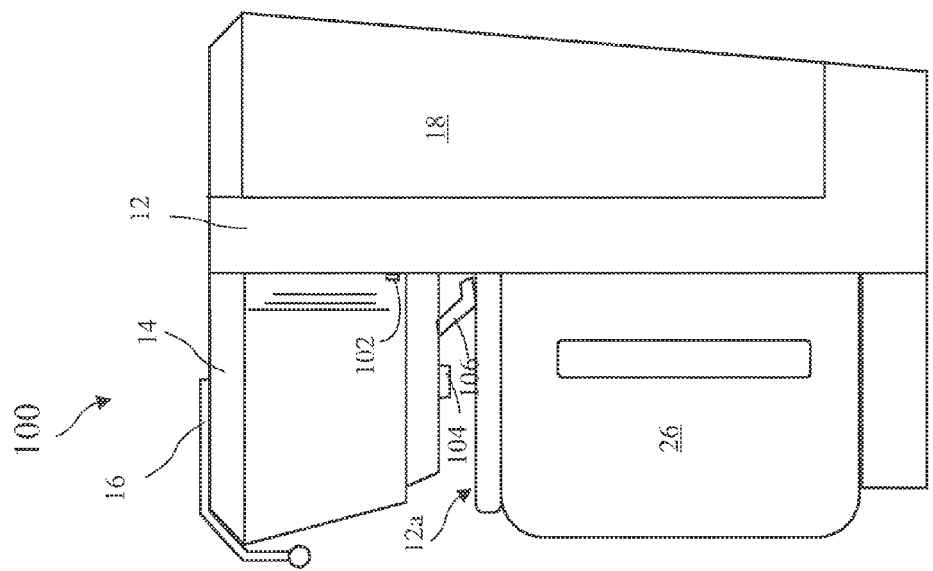
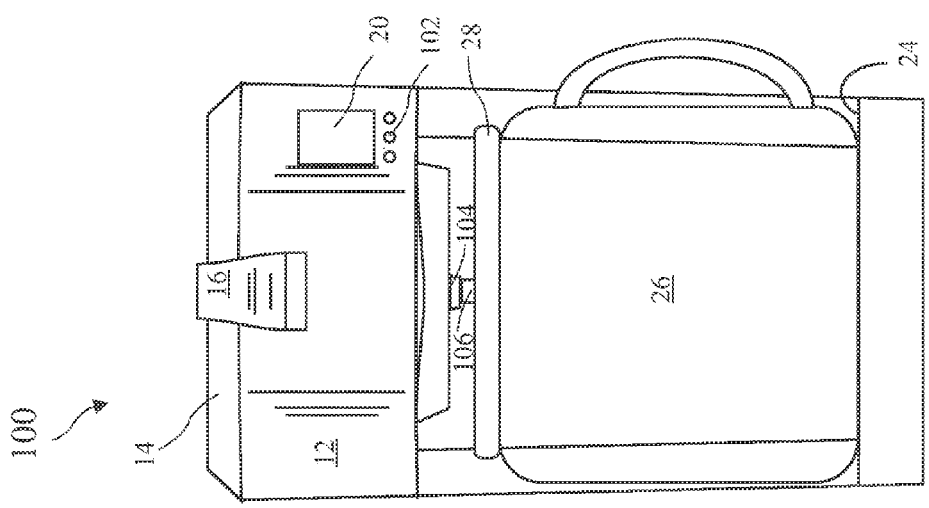

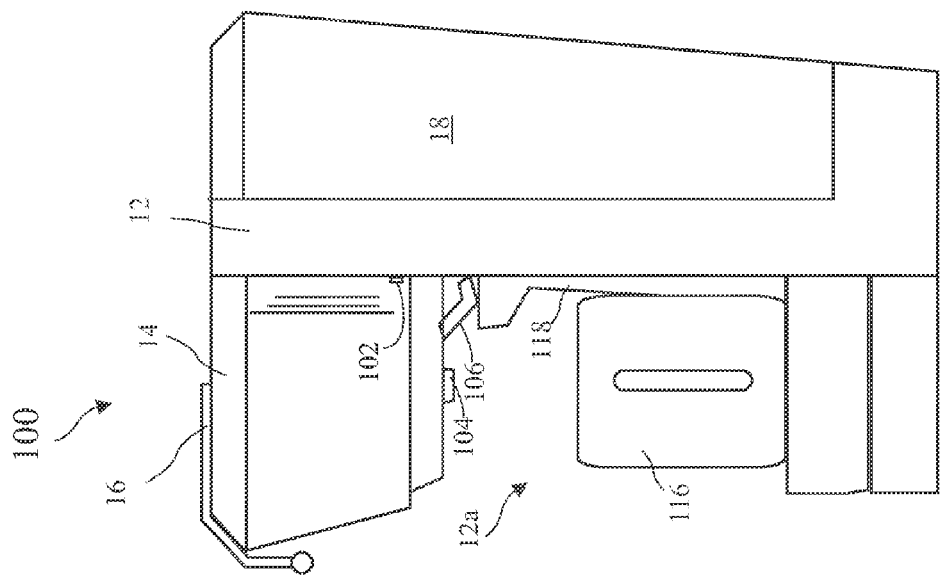
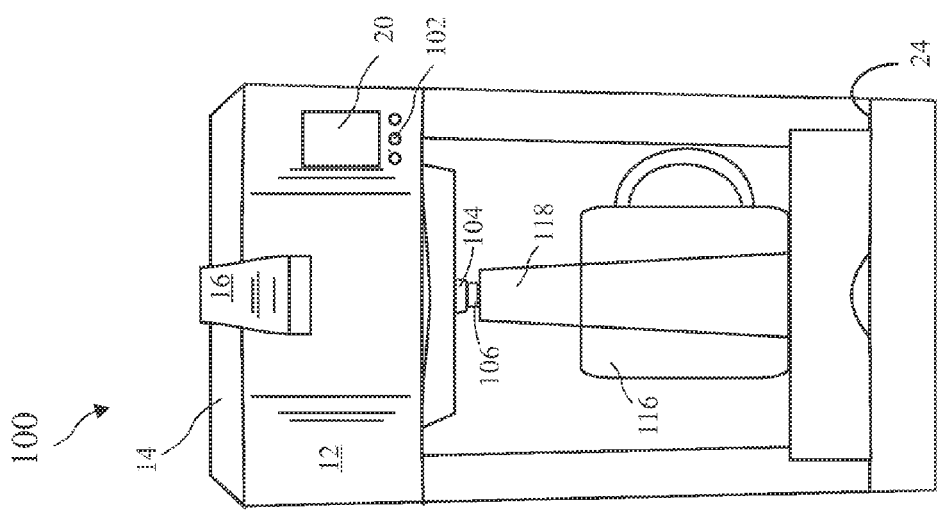
FIG. 66A
FIG. 66B

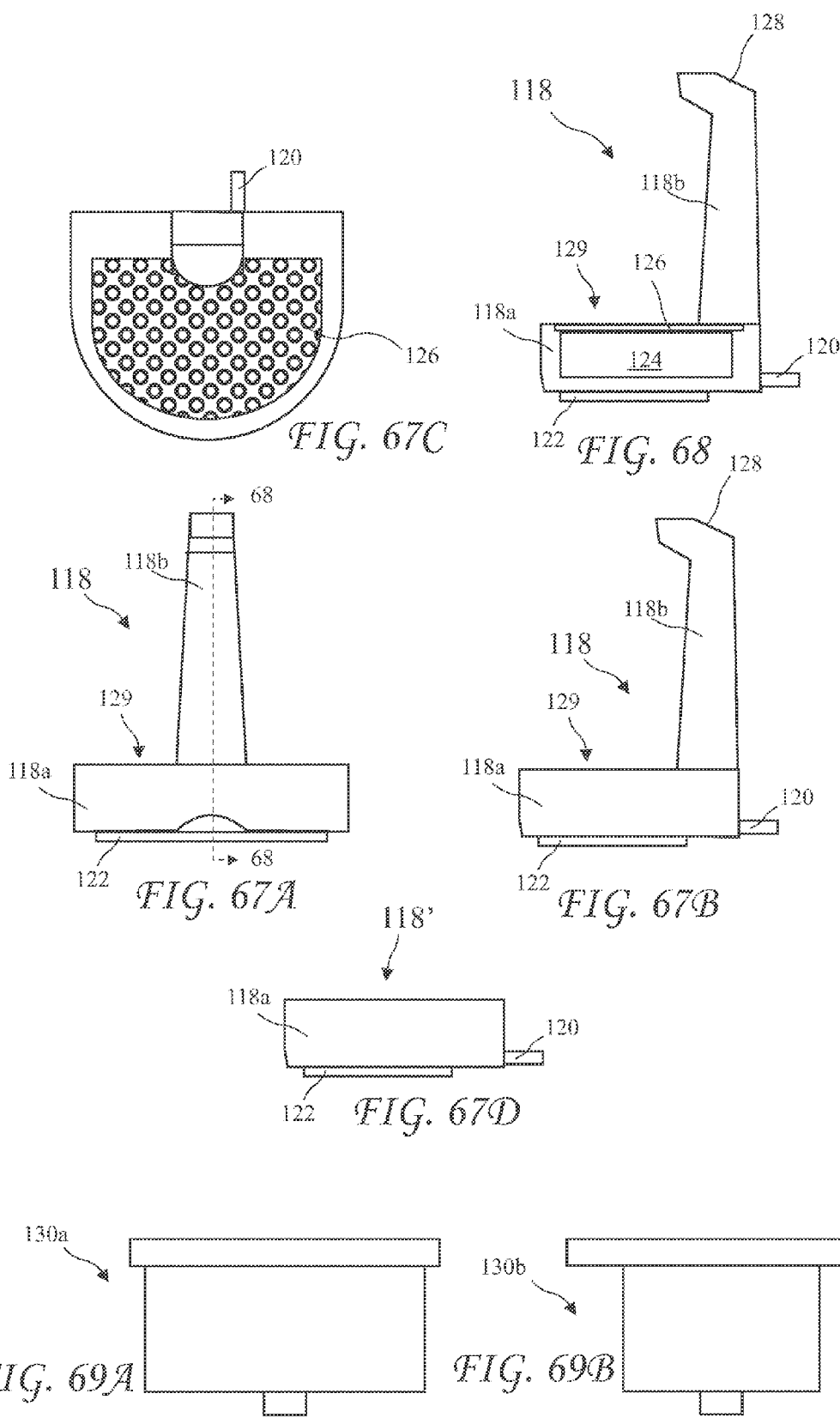

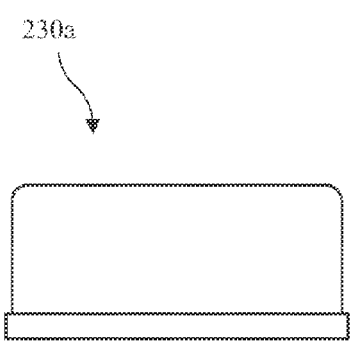
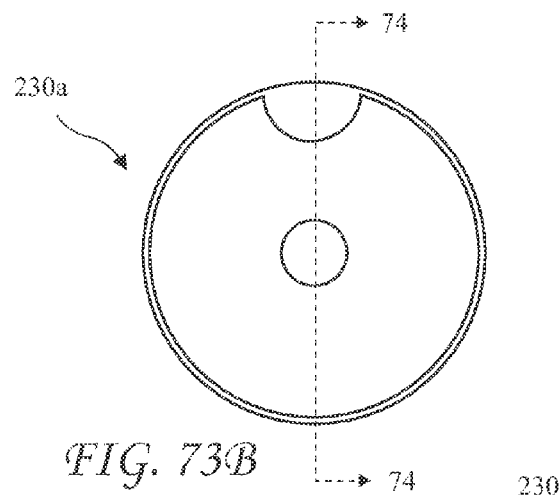
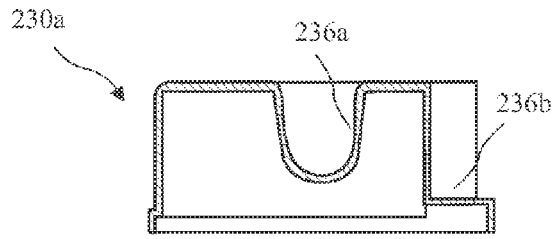
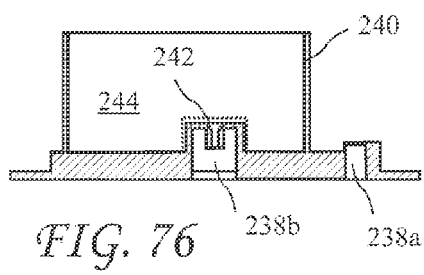
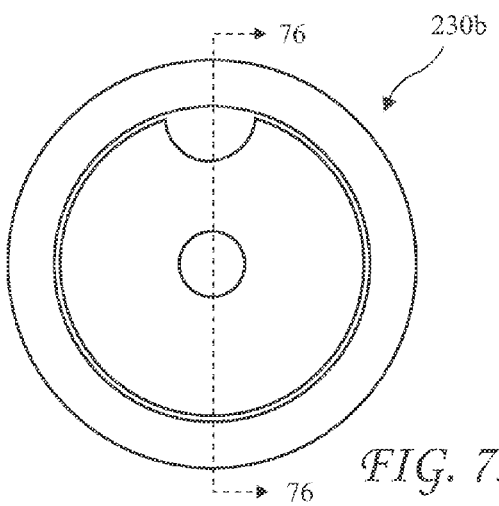
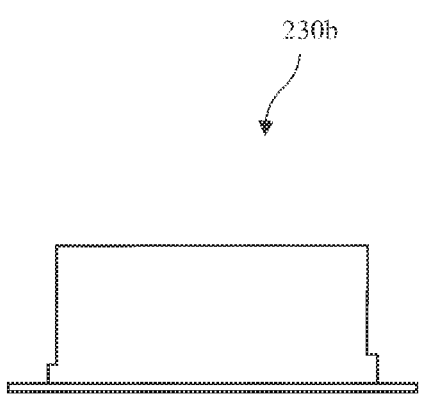

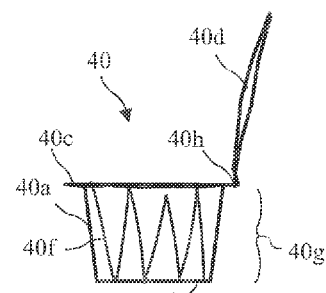
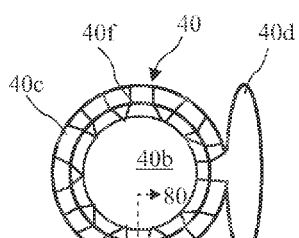
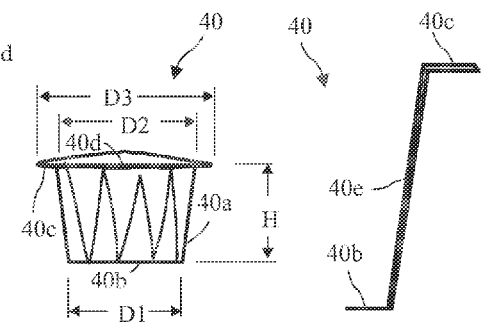
FIG. 79A   FIG. 79B   FIG. 79C   FIG. 80
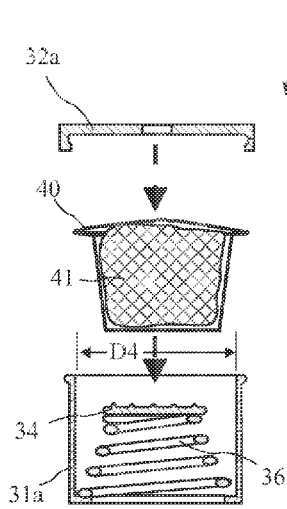
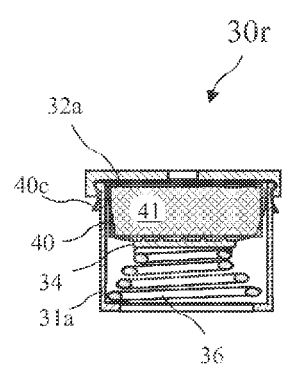
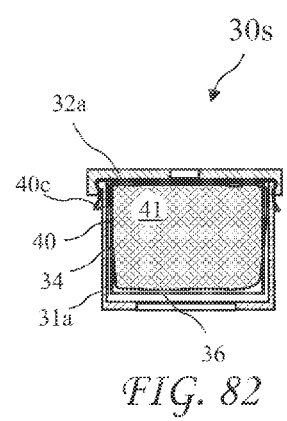
FIG. 81A   FIG. 81B   FIG. 82

SINGLE SERVING BREWING MATERIAL ADAPTER WITH READABLE LABEL

The present application claims the priority of:
U.S. Provisional Patent Application Ser. No. 60/594,972 filed May 23, 2005, and is a Continuation In Part of:
U.S. patent application Ser. No. 11/392,893 filed Mar. 28, 2006;
U.S. patent application Ser. No. 11/777,831 filed Jul. 13, 2007;
U.S. patent application Ser. No. 12/610,181 filed Oct. 30, 2009;
U.S. patent application Ser. No. 12/620,584 filed Nov. 17, 2009;
U.S. patent application Ser. No. 12/762,262 filed Apr. 16, 2010; and
U.S. patent application Ser. No. 12/960,496 filed Dec. 4, 2010 which applications are incorporated in their entirety herein by reference.

BACKGROUND OF THE INVENTION

The present invention relates to brewing coffee and in particular to a single serving brewing material holder.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 11/777,831 filed Jul. 13, 2007 for "Pod Adapter System for Single Service Beverage Brewers" by the present applicant overcomes this problem using pre-packaged coffee in closed filter paper commonly called a pod, and inserting the closed pod into a pod holder including a tamping spring and bottom tamper for tamping the pod between the bottom tamper and a coffee holder lid. While the pod adapter of the '831 application works well for coffee pods, it does not always hold the pod (or packer) firmly against the cover of the pad adapter and in some instances a needle for injecting water into the pod fails to puncture the pod.

BRIEF SUMMARY OF THE INVENTION

The present invention addresses the above and other needs by providing an adapter for single serving cartridges which includes a coffee maker readable identification feature. The identification feature may be visual (for example any feature which may be read or a bar code), a readable magnetic strip, a Radio Frequency Identification (RFID), or any feature able to contain information and provide that information to a reader. The adapter may be configured for known disposable single serving cartridges, and may include one or more needles to puncture the cartridges for use. The identification feature may inform the coffee maker that an adapter carrying a disposable single serving cartridge is in use, and adjust the coffee maker accordingly.

In accordance with an aspect of the invention, there is provided a beverage pod. The beverage pod includes: a receptacle, said receptacle comprising a downward concave cup having pleated walls and shaped to receive and hold a brewing material and a pleated annular rim circling the downward concave cup; a flat cover hingedly attached to the annular rim, said cover is configured to cover the upper opening and the annular rim of the receptacle, wherein the receptacle and the cover are made of water permeable material comprising a smaller diameter first portion forming the flat cover and a larger diameter second portion forming the receptacle and forming the downward concave cup of the receptacle from the larger diameter second portion creates the folds in the downward concave cup; brewing material residing in the receptacle; and the annular rim and edge of the cover reside between a lid and body of a pod holder holding the annular rim and edge of the cover together to seal the pod. The pod cover is held taut by the cooperation of the lid and body of a pod holder to facilitate puncturing the pod cover for injecting heated water into the pod is tamped by a spring residing in the pod holder. The brewing material is retained in the pod solely by attaching a lid of the pod holder to the base of the pod holder to sandwich the annular rim of the receptacle and the outer edge of the cover between the lid of the pod holder to the base of the pod holder.

In accordance with a second aspect of the invention, there is provided a method of manufacturing a package assembly and constructing a beverage pod. The method includes: forming a package assembly comprising the steps of: providing water permeable material; forming substantially circular lower and upper portions hingedly connected to each other, from the water permeable material; shaping the lower portion to form a downward concave cup shaped receptacle to receive and hold a brewing material; forming an annular rim surrounding the top of the concave cup shape of the receptacle therein the upper portion is configured to fold along the hinge over the lower portion and onto the annular rim to provide a cover for the receptacle to form a single pod; and providing the package assembly to an individual user. Manufacturing a single beverage pod by the user includes the steps of: obtaining a pod holder; positioning the receptacle of the package assembly in a base of the pod holder; positioning the annular rim on a top edge of the base of the pod holder; filling the receptacle of the package assembly with the brewing material; folding the cover of the package assembly over the receptacle; and attaching a lid of the pod holder to the base of the pod holder to sandwich the annular rim of the receptacle and the outer edge of the cover between the lid of the pod holder to the base of the pod holder. The lid of the pod holder and the base of the pod holder sandwich the annular rim of the receptacle and the outer edge of the cover to hold the cover taut to facilitate puncturing the pod cover for injecting heated water into the pod and attaching a lid of the pod holder to the base of the pod holder to sandwich the annular rim of the receptacle and the outer edge of the cover between the lid of the pod holder to the base of the pod holder is the sole method of sealing the pod. Attaching a lid of the pod holder to the base of the pod holder to sandwich the annular rim of the receptacle and the outer edge of the cover between the lid of the pod holder to the base of the pod holder is the sole method of retaining the brewing material in the pod.

In accordance with a third aspect of the invention, there is provided apparatus for tamping coffee. The apparatus includes a coffee maker and a coffee holder. The coffee holder receives a portion of untamped coffee and a holder lid closes the coffee holder after receiving the untamped coffee. A tamper resides inside the coffee holder and limits the portion of the coffee holder interior accessible by the untamped coffee and partially resides outside the coffee holder. The coffee maker includes a coffee maker lid openable to position the coffee holder inside the coffee maker, a coffee holder cavity under the coffee maker lid for receiving the coffee holder. A pad residing on a bottom surface of the coffee maker lid and is configured to reduce the combined vertical space occupied by the coffee holder and tamper to urge the tamper into the coffee holder thereby tamping the coffee. A hot water nozzle is attached to the coffee maker for providing a flow of hot water to the tamped coffee to make a coffee drink.

In accordance with another aspect of the invention, there is provided apparatus for tamping coffee. The apparatus includes a coffee maker and a coffee holder. The coffee holder has a coffee holder interior space for receiving a portion of untamped coffee and a holder lid closing the coffee holder interior space after receiving the untamped coffee. The coffee maker includes a coffee maker lid openable to position the coffee holder inside the coffee maker and a coffee holder cavity under the coffee maker lid for receiving the coffee holder. A tamper residing in the coffee holder cavity is coupled to the coffee holder lid to advance into the coffee holder interior space when the coffee maker lid is closed. A hot water nozzle attached to the coffee maker for providing a flow of hot water to the tamped coffee to make a coffee drink.

In accordance with yet another aspect of the invention, there is provided a coffee making system combining a forced flow of heated water forced though tamped coffee, and apparatus and methods for tamping loose coffee for use in the coffee maker.

In accordance with another aspect of the invention, there is provided a self-tamping coffee holder tamps loose ground coffee obtaining richer flavor. The coffee holder includes a holder base and a holder cap. Coffee is loosely deposited in the coffee holder and the holder cap is attached to the holder base. An internal filter chamber holds the coffee and allows tamping of the coffee into a compacted state. The filter chamber may be formed by a fixed filter or by a removeable filter constructed of filter paper, nylon mesh, metal mesh, or any material capable of holding the coffee while allowing a flow of heated water through the coffee. The tamping may be by a spring or by a resilient solid material attached to the coffee holder and may push the coffee down inside the filter or push the filter and the coffee up against the holder lid.

In accordance with yet another aspect of the invention, there is provided a self tamping coffee holder comprising: a coffee holder base for receiving a portion of untamped coffee; a holder lid closing the coffee holder after receiving the untamped coffee in the coffee holder; and a tamper element of the coffee holder advancing inside the coffee holder to tamp the untamped coffee inside the coffee holder. The self tamping coffee holder may further include a tamping spring. The tamping spring may reside under the untamped coffee inside the holder base and attaching the holder lid to the coffee holder sandwiches the coffee between the holder lid and the tam ping spring to tamp the coffee, and the holder lid may include a small passage allowing entry of a nozzle into the coffee holder but not entry of tamping apparatus into the coffee holder. In another embodiment the tamping spring resides over the untamped coffee and the tamping spring may be attached to the holder lid and attaching the holder lid to the holder base sandwiches the coffee between the holder base and the tam ping spring to tamp the coffee. The tamper may be a recessed portion of the holder lid which enters the holder base when the holder lid is attached to a holder base to sandwich the coffee between the holder base and the recessed portion of the holder lid to tamp the coffee and the holder lid may include a male threaded portion and the holder base includes a female threaded portion and the holder lid is attached to the holder base by screwing the holder lid into the holder base and the coffee is sandwiched between the male threaded portion and the holder base to tamp the coffee. The self tamping coffee holder may further include a filter paper cup lining the interior of the holder base and the filter paper cup may include a top rim portion reaching above and outwardly from the interior of the holder base for sandwiching between the holder base and the holder lid to seal the coffee holder, and the engagement of the holder lid with the holder base may sandwiches the top rim portion of the filter paper cup to secure the filter paper cup. When the tamping spring resides in the bottom of the holder base, a bottom tamper may be supported by the tamping spring, and the coffee holder may further including a latch for holding the bottom tamper in a down position and releasing the bottom tamper to tamp the coffee after the coffee is in the coffee holder and the holder lid is attached, and a lever may be included for holding the latch in a first position retaining the bottom tamper, wherein a user may press the lever to release the latch to tamp the coffee. Further, attaching the holder lid to the holder base may press the arm against the lever to release the latch to tamp the coffee.

In accordance with another aspect of the invention, there is provided a self tamping coffee holder comprising: a holder base; a filter cup residing in the interior of the holder base for receiving a portion of untamped coffee; a top rim portion of the filter cup reaching above and outwardly from the interior of the holder base; a holder lid closing the holder base after receiving the untamped coffee in the coffee holder, engagement of the holder lid with the holder base sandwiching the top rim portion of the filter paper cup and secures the filter paper cup; and a tamping spring inside the coffee holder under the coffee to sandwich the coffee between a bottom tamper and the holder lid to tamp the untamped coffee inside the holder base when the holder lid is attached. The filter cup may include a rim and a filtering material attached to the rim and forming a concave surface for holding coffee and the filter cup is preferably made from filter paper.

In accordance with yet another aspect of the invention, there is provided a self tamping coffee holder comprising: a holder base; a filter chamber residing in the interior of the holder base for receiving a portion of untamped coffee; a top rim portion of the filter cup reaching above the interior of the holder base; a holder lid closing the holder base after receiving the untamped coffee in the coffee holder; and a recessed portion of the holder lid reaching inside the holder base to tamp the untamped coffee inside the filter chamber when the holder lid is attached.

In accordance with still another aspect of the invention, there is provided a multi-mode coffee maker which facilitates switching between a carafe mode and a single cup mode. The coffee maker includes switches for selecting the amount of coffee brewed, a drip valve normally closed to prevent dripping and opened by insertion of a carafe or a single cup adapter into the coffee maker, and a hot plate for maintaining the temperature of coffee in the carafe, the hot plate independent switchable on and off. An upper edge of the carafe, and an arm reaching from the single cup adapter, engage a lever opening the drip valve. The hot plate may be manually turned on and off, or the single cup adapter may cooperate with a switch in the coffee maker to turn the hot plate off.

In accordance with another aspect of the invention, there is provided a multi-mode coffee maker comprising: a body; a cavity in the body for receiving dry coffee; a water container coupled to the body for providing water to make brewed coffee; a heater for heating the water to make the brewed coffee; manually operated controls to select between a volume of brewed coffee for filling a single cup brewed coffee container and for filling a multi-cup brewed coffee container; a mouth on the front of the body for receiving the brewed coffee container; a platform at the bottom of the mouth for supporting the multi-cup brewed coffee container; a hot plate on a top surface of the platform for heating the multi-cup brewed coffee container; a spout/drip valve above the platform having an open position for releasing the volume of brewed coffee into the brewed coffee container and a closed position for restricting the release of the volume of brewed coffee; a valve actuator connected to the spout/drip valve, the valve actuator cooperating with the multi-cup brewed coffee container to open the spout/drip valve when the multi-cup brewed coffee container is placed into the multi-mode coffee maker; and a single cup adapter configured to fit into the mouth of the multi-mode coffee maker, the single cup adapter including: a single cup platform for supporting the single cup brewed coffee container; an actuating arm, the actuating arm cooperating with the valve actuator to open the spout/drip valve when the single cup adapter is positioned in the multi-mode coffee maker; and a finger reaching from the single cup adapter to actuate a switch attached to the multi-mode coffee maker to turn the hot plate off when the single cup adapter is positioned in the multi-mode coffee maker.

In accordance with another aspect of the invention, there is provided a multi-mode coffee maker comprising: a body; an opening lid attached to the body for receiving a dry coffee holder; a water container coupled to the body for providing water to make brewed coffee; a heater for heating the water to make the brewed coffee; manually operated controls to select between a volume of brewed coffee for filling a single cup brewed coffee container and for filling a multi-cup brewed coffee container; a mouth on the front of the body for receiving the brewed coffee container; a platform at the bottom of the mouth for supporting the multi-cup brewed coffee container; a hot plate on a top surface of the platform for heating the multi-cup brewed coffee container; a spout/drip valve above the platform having an open position for releasing the volume of brewed coffee into a brewed coffee container comprising a multi-cup brewed coffee container and a single cup brewed coffee container and a closed position for restricting the release of the volume of brewed coffee; a drip valve lever connected to the spout/drip valve, the drip valve lever cooperating with an upper lip of the multi-cup brewed coffee container to open the spout/drip valve when the multi-cup brewed coffee container is placed into the multi-mode coffee maker; a single cup adapter configured to fit into the mouth of the multi-mode coffee maker to support the single cup brewed coffee container, the single cup adapter including: a single cup platform for supporting the single cup brewed coffee container; a drip tray for catching drips from the spout/drip valve when the single cup brewed coffee container is not resting on the single cup adapter; an upward reaching arm, the upward reaching arm cooperating with the drip valve lever to open the spout/drip valve when the single cup adapter is placed into the multi-mode coffee maker; and a rearward reaching finger configured to enter a passage in the body of the multi-mode coffee maker to actuate a switch to turn the hot plate off; and a first dry coffee holder configured to hold an amount of dry coffee for making a first sufficient volume of dry coffee to fill the multi-cup brewed coffee container; and a second dry coffee holder configured to hold an amount of the dry coffee for making a second sufficient volume of brewed coffee to fill the single cup brewed coffee container, the first and second dry coffee holders interchangeably fitting the multi-mode coffee maker.

In accordance with still another aspect of the invention, there is provided a reuseable brewed beverage cartridge. The reuseable brewed beverage cartridge includes a base and a cover. The base includes an inlet for water (preferably heated) and an outlet for beverage, and a wall separating the inlet form the outlet. Brewing material in placed inside the wall and the water entering the inlet travels up the exterior of the wall, and then down through the brewing material to create a brewed beverage. Loose brewing material, prepackaged brewing material, for filter paper filled with loose brewing material.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 is a side view of the coffee maker with an open lid allowing placement of a coffee holder according to the present invention inside the coffee maker.

FIG. 2A is a functional diagram of the coffee maker.

FIG. 3 is a side view of a first coffee holder according to the present invention.

FIG. 4 is a cross-sectional side view of the first coffee holder according to the present invention taken along line 4-4 of FIG. 3.

FIG. 5A is a cross-sectional side view of the first coffee holder according to the present invention taken along line 4-4 of FIG. 3 showing an empty coffee holder with the tamping spring and the bottom tamper according to the present invention.

FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.

FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.

FIG. 5D is a cross-sectional side view of the first coffee holder according to the present invention taken along line 4-4 of FIG. 3 showing the coffee holder with the tamping spring and bottom tamper, the portion of coffee in the coffee holder, and the holder lid attached to the coffee holder body, according to the present invention.

FIG. 6 is a top view of the first holder lid.

FIG. 7A is a side view of a filter paper cup according to the present invention.

FIG. 7B is a top view of the filter paper cup according to the present invention.

FIG. 7C is a second embodiment of the filter paper cup with a lid.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 14A shows the second coffee holder ready for insertion into the coffee maker.

FIG. 14B shows the second coffee holder inserted into the coffee maker before tamping the coffee.

FIG. 14C shows the second coffee holder inserted into the coffee maker after tamping the coffee.

FIG. 15 is a side view of a third coffee holder according to the present invention.

FIG. 16 is a cross-sectional side view of the third coffee holder according to the present invention taken along line 16-16 of FIG. 15.

FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.

FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.

FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

FIG. 19 is a side view of a fourth coffee holder according to the present invention.

FIG. 20 is a cross-sectional side view of the fourth coffee holder according to the present invention taken along line 20-20 of FIG. 19.

FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.

FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.

FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

FIG. 27 is a side view of a sixth coffee holder according to the present invention.

FIG. 28 is a cross-sectional side view of the sixth coffee holder according to the present invention taken along line 28-28 of FIG. 27.

FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.

FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.

FIG. 29C is a cross-sectional side view of the sixth coffee holder according to the present invention taken along line 28-28 of FIG. 27 showing the portion of coffee in the coffee holder, and the holder lid attached and tamping the coffee, according to the present invention.

FIG. 30 is a side view of a seventh coffee holder according to the present invention.

FIG. 31 is a cross-sectional side view of the seventh coffee holder according to the present invention taken along line 31-31 of FIG. 30.

FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.

FIG. 32B is a cross-sectional side view of the seventh coffee holder according to the present invention taken along line 31-31 of FIG. 30 showing the portion of coffee in the coffee holder, and the holder lid ready to attach to the holder body. according to the present invention.

FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

FIG. 33 is a side view of an eighth coffee holder according to the present invention.

FIG. 34A is a cross-sectional side view of the eighth coffee holder taken along line 34-34 of FIG. 33 showing a portion of coffee for placing inside the coffee holder and the holder lid with an insertable portion and an O-Ring inside the coffee holder for sealing according to the present invention.

FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

FIG. 35 is a side view of a ninth coffee holder according to the present invention.

FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.

FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 41 is a side view of a tenth coffee holder with straight walls according to the present invention.

FIG. 42 is a cross-sectional view of the tenth coffee holder taken along line 42-42 of FIG. 41 showing an empty coffee holder.

FIG. 43 is a cross-sectional view of the tenth coffee holder taken along line 42-42 of FIG. 41 showing a full and tamped coffee holder.

FIG. 44 is a side view of an eleventh coffee holder with straight walls according to the present invention.

FIG. 45 is a cross-sectional view of the eleventh coffee holder taken along line 45-45 of FIG. 44 showing an empty coffee holder.

FIG. 46 is a cross-sectional view of the eleventh coffee holder taken along line 45-45 of FIG. 41 showing a full and tamped coffee holder.

FIG. 47A is a side view of a top tamper.

FIG. 47B is a top view of the top tamper.

FIG. 47C is a side view of a top tamper with a seal according to the present invention.

FIG. 47D is a top view of the top tamper with a seal.

FIG. 48 is a perspective view of a filter paper cup with a folding cup lid.

FIG. 52 is a side view of a thirteenth coffee holder with a releaseable tamping latch according to the present invention.

FIG. 53 is a cross-sectional view of the thirteenth coffee holder taken along line 53-53 of FIG. 52 showing an empty coffee holder.

FIG. 54A is a cross-sectional view of the thirteenth coffee holder taken along line 53-53 of FIG. 52 showing a lid, coffee, a filter paper cup, above the base, and the coffee holder base, with the tamping latch retaining the bottom tamper.

FIG. 54B is a cross-sectional view of the thirteenth coffee holder taken along line 53-53 of FIG. 52 showing the lid, above the coffee and the filter paper cup resting in the coffee holder base, with the tamping latch retaining the bottom tamper.

FIG. 54C is a cross-sectional view of the thirteenth coffee holder taken along line 53-53 of FIG. 52 showing the lid, above the coffee and the filter paper cup resting in the coffee holder base with the tamping latch retaining the bottom tamper.

FIG. 54D is a cross-sectional view of the fourteenth coffee holder taken along line 53-53 of FIG. 52 showing the lid attached to the base with the coffee and the filter paper cup residing in the coffee holder base with tamping latch released and the coffee tamped.

FIG. 62A shows a pre-packaged brewing material for use in the coffee making according to the present invention.

FIG. 62B shows a cut away view of the pre-packaged brewing material for use in the coffee making according to the present invention showing the brewing material.

FIG. 62C shows the pre-packaged brewing material in a coffee holding having a window to expose a bar code.

FIG. 63D shows the pre-packaged brewing material in the coffee holding having the window to expose a bar code in the cavity of a coffee maker including a bar code reader.

FIG. 62E shows a coffee holder having the bar code on the coffee holder in the cavity of a coffee maker including the bar code reader FIG. 62F shows a cross-sectional view of the coffee holder having the bar code taken along line 62F-62F of FIG. 62E.

FIG. 63A is a side view of a filter cup according to the present invention.

FIG. 63B is a top view of the filter cup according to the present invention.

FIG. 64 is a side view of multi-mode coffee maker according to the present invention.

FIG. 65A is a front view of the multi-mode coffee maker according to the present invention with a carafe positioned for receiving a volume of coffee.

FIG. 65B is a side view of the multi-mode coffee maker according to the present invention with the carafe positioned for receiving a volume of coffee.

FIG. 66A is a front view of the multi-mode coffee maker according to the present invention with a coffee cup positioned for receiving a volume of coffee.

FIG. 66B is a side view of the multi-mode coffee maker according to the present invention with the coffee cup positioned for receiving a volume of coffee.

FIG. 67A is a front view of a single cup adapter according to the present invention.

FIG. 67B is a side view of the single cup adapter according to the present invention.

FIG. 67C is a top view of the single cup adapter according to the present invention.

FIG. 67D is a side view of a second single cup adapter according to the present invention.

FIG. 68 is a cross-sectional view of the single cup adapter according to the present invention taken along line 68-68 of FIG. 67A.

FIG. 69A is a side view of a multi-serving coffee holder according to the present invention for use in the multi-mode coffee maker for making several cups of coffee.

FIG. 69B is a side view of a single-serving coffee holder according to the present invention for use in the multi-mode coffee maker for making one cup of coffee.

Figure 70:
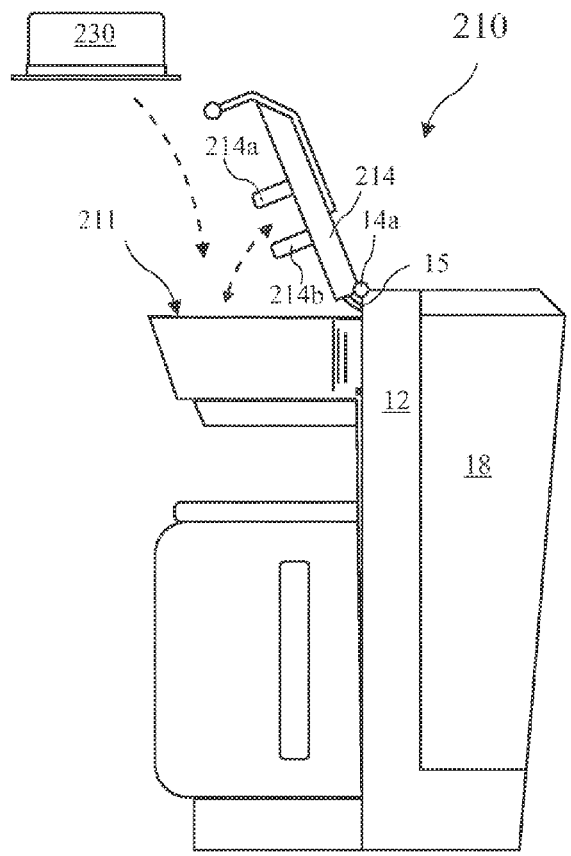

FIG. 70 shows a coffee maker and reuseable cartridge according to the present invention.

Figure 71A:
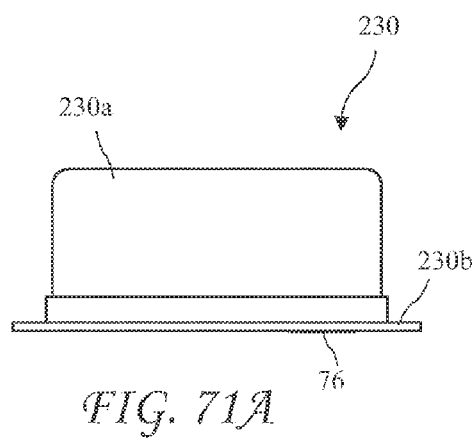

FIG. 71A shows a side view of the reuseable cartridge according to the present invention.

Figure 71B:
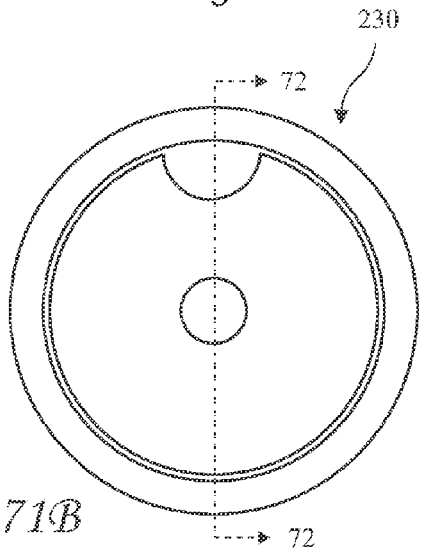

FIG. 71B shows a top view of the reuseable cartridge according to the present invention.

Figure 72:
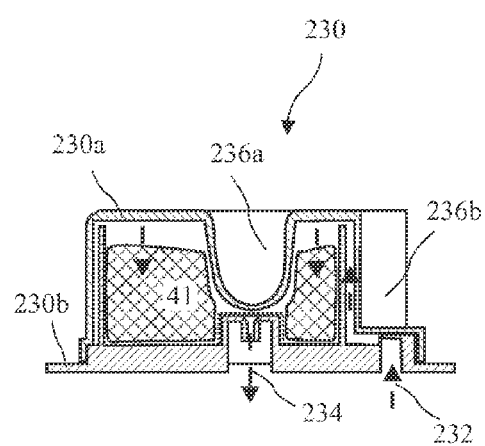

FIG. 72 show a cross-sectional view of the reuseable cartridge according to the present invention taken along line 72-72 of FIG. 71B.

FIG. 73A shows a side view of a cover of the reuseable cartridge according to the present invention.

FIG. 73B shows a top view of the cover of the reuseable cartridge according to the present invention.

FIG. 74 show a cross-sectional view of the cover of the reuseable cartridge according to the present invention taken along line 74-74 of FIG. 73B.

FIG. 75A shows a side view of a base of the reuseable cartridge according to the present invention.

FIG. 75B shows a top view of the base of the reuseable cartridge according to the present invention.

FIG. 76 show a cross-sectional view of the base of the reuseable cartridge according to the present invention taken along line 76-76 of FIG. 75B.

Figure 77A:
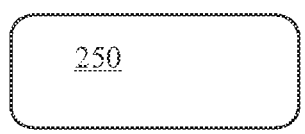

FIG. 77A shows a side view of a brewed beverage pod for use in the reuseable cartridge according to the present invention.

Figure 77B:
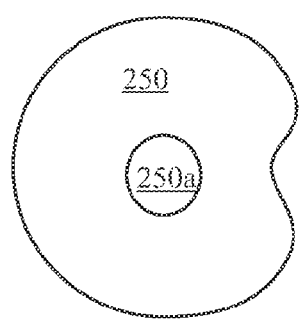

FIG. 77B shows a top view of the brewed beverage pod for use in the reuseable cartridge according to the present invention.

Figure 78A:
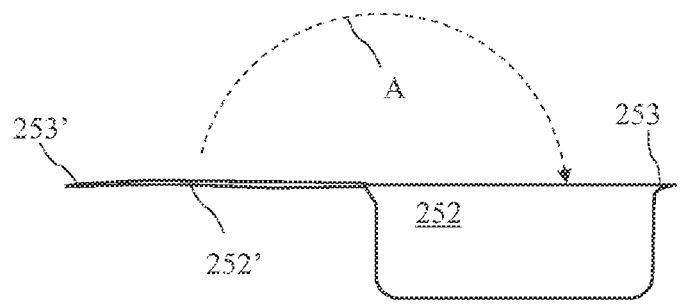

FIG. 78A shows a side view of filter paper for use in the reuseable cartridge according to the present invention.

Figure 78B:
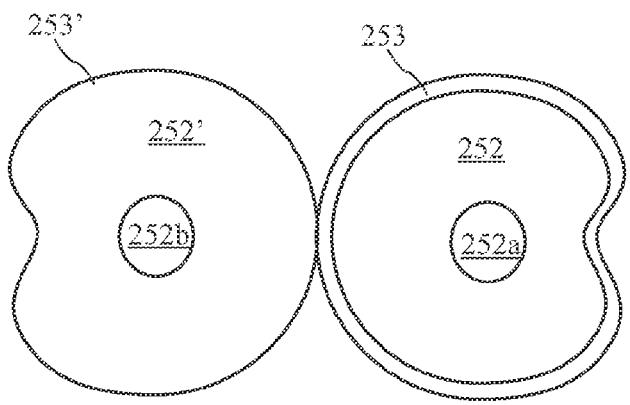

FIG. 78B shows a top view of the filter paper for use in the reuseable cartridge according to the present invention.

FIG. 79A shows a side view of the filter paper cup according to the present with the folding paper lid open.

FIG. 79B shows a top view of the filter paper cup according to the present.

FIG. 79C shows a second side view of the filter paper cup with the folding paper lid closed FIG. 80 is a cross-sectional view of the filter paper cup taken along line 80-80 of FIG. 79B showing folds according to the present.

FIG. 81A is a cross-sectional side view of the coffee holder according to the present invention showing the coffee holder with the tamping spring and bottom tamper, the filter paper cup containing a portion of coffee, and the holder lid ready to attach to a holder body according to the present invention.

FIG. 81B is a cross-sectional side view of the coffee holder according to the present invention showing the coffee holder with the tamping spring and bottom tamper, the portion of coffee in the filter paper cup, and the holder lid attached to the holder body with the rim of the filter paper cup sandwiched between the lid and coffee holder and the tamping spring and bottom tamper pushing the filter paper cup against the lid according to the present invention.

FIG. 82 is a cross-sectional side view of an embodiment of the coffee holder according to the present invention without a tamping spring and bottom tamper.

Figure 83A:
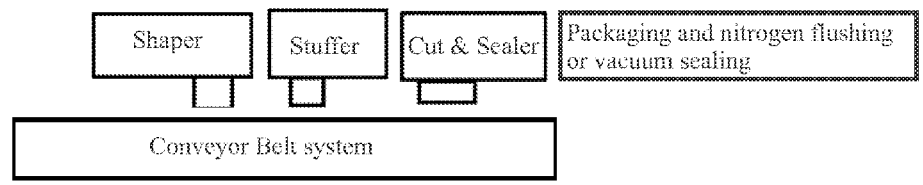
Figure 83B:
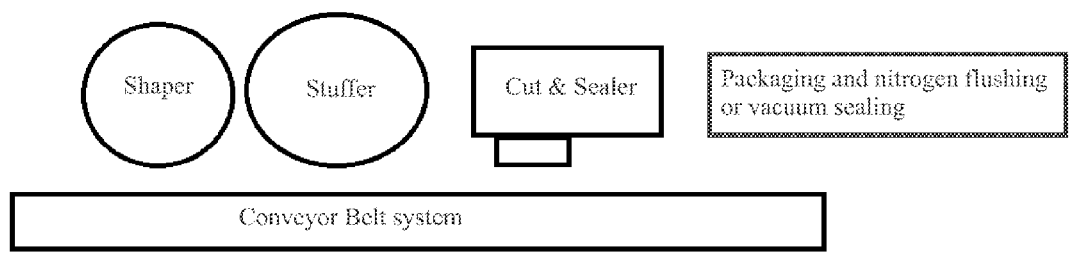
Figure 83C:
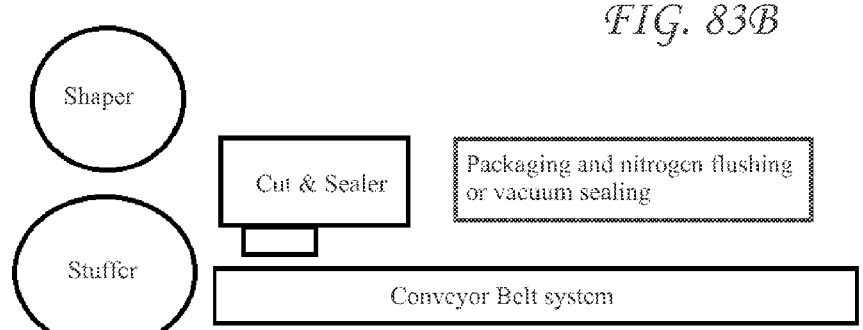

FIGS. 83A-83C are functional diagrams of machines for manufacturing pods according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1C:
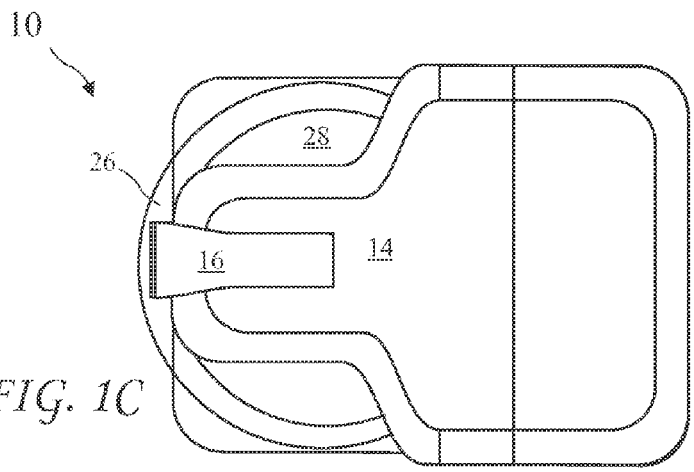
FIG. 1C is a top view of the coffee maker according to the present invention.
Figure 1A:
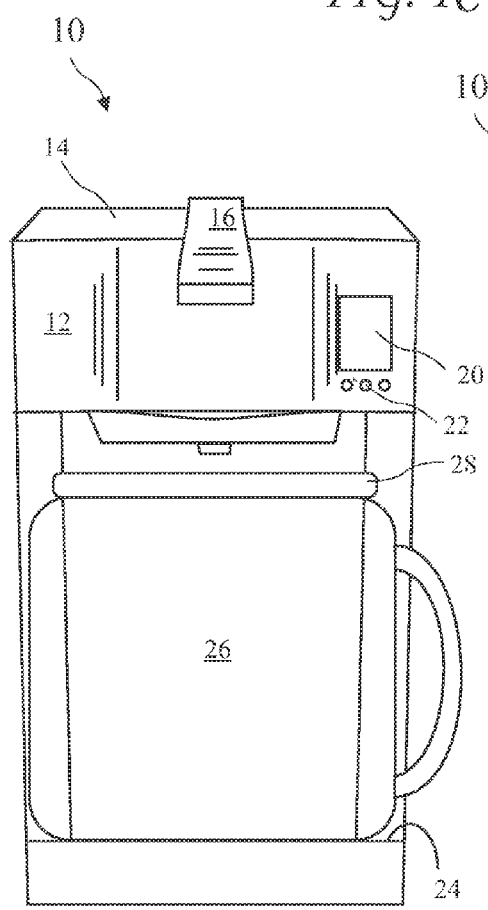
FIG. 1A is a front view of a coffee maker according to the present invention.
Figure 1B:
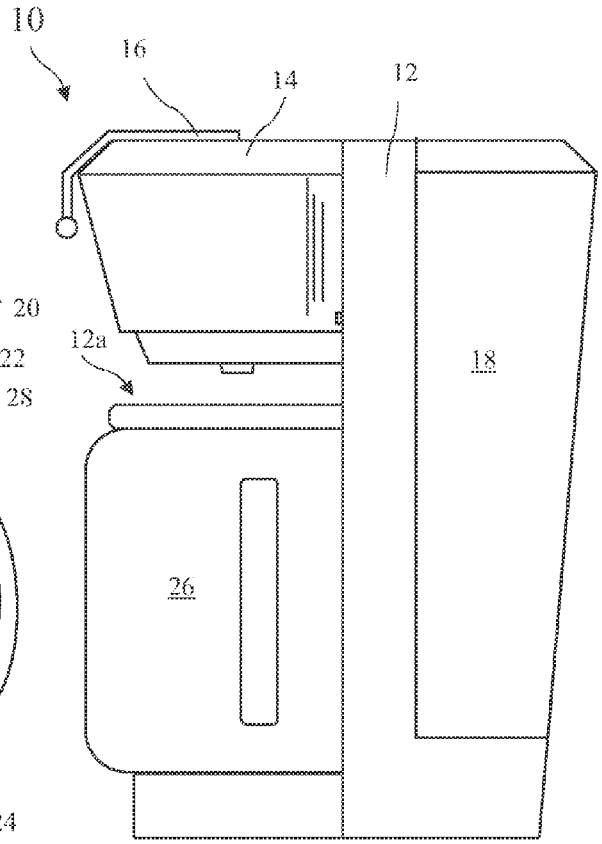
FIG. 1B is a side view of the coffee maker according to the present invention.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, a platform 24 and a mouth 12a. A coffee pitcher 26 rests on the platform 24 inside the mouth 12a and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

A side view of the coffee maker 10 with an open lid 14 allowing placement of a coffee holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring the water in the water tank 18, and a coffee maker using any means to provide a forced flow of water is intending to within the scope of the present invention.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 36 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

A cross-sectional side view of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30a with the tamping spring 36 and bottom tamper 34, a portion of loose coffee 41, and the holder lid 32a ready to attach is shown in FIG. 5B. A cross-sectional side view of the first coffee holder 30a taken along line 4-4 of FIG. 3 showing the coffee holder 30a with the tamping spring 36 and bottom tamper 34, a portion of coffee in the volume 38, and the holder lid 32a ready to attach is shown in FIG. 5C. A cross-sectional side view of the first coffee holder 30a taken along line 4-4 of FIG. 3 showing the coffee holder 30a with the tamping spring 36 and bottom tamper 34, a portion of loose coffee 41 in the volume 38, and the holder lid 32a attached to the coffee holder 30a, is shown in FIG. 5D.

A top view of the first holder lid 32a showing the passage 33 provided for the nozzle 19 (see FIG. 2) is shown in FIG. 6.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The rim 40c rests on a top edge of the holder body 31 and is held between the holder cap and body when the cap is placed on the body, thereby preventing or restricting the escape of coffee 41 from the cup 40 when hot water flows into the coffee holder 30a.

A second embodiment of the filter paper cup 40' with a folding paper lid 40d is shown in FIG. 7C. The lid 40d of the filter paper cup 40' may be folded over the cup 40' after loose coffee is poured into the cup. The lid 40d preferably includes a perforation 40e centered on the lid 40d allowing the nozzle 19 to enter and/or inject the hot flow of water into the tamped coffee 41.

The filter cups may be made from several materials including filter paper, nylon mesh, steel mesh, or any material suitable for filtration.

The first coffee holder 30a is shown ready for insertion into a first coffee maker 10a in FIG. 8A, the first coffee holder 30a is shown inserted into the coffee maker 10 before tamping the coffee 41 in FIG. 8B, and the first coffee holder 30a is shown in the coffee maker 10 after tamping the coffee 41 in FIG. 8C. The coffee maker includes a cavity 11 for accepting the coffee holder and has walls 11a for aligning the coffee holder in the coffee maker. When the lid 14 is closed, the pad 17 on the bottom of the lid 14 and/or arms 25 attached to the bottom of the lid 25, push the coffee holder 30a down over the tamping spring 36 and the coffee 41 is tamped between the lid 32a and the bottom tamper 34. The arms 25 push the coffee holder 30a down ahead of the nozzle 19 thereby seating the coffee holder 30a in the cavity 11 for alignment of the nozzle 10 with the passage 33 in the lid 32a.

Figure 9:
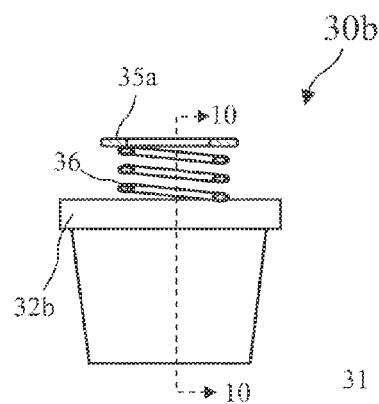
FIG. 9 is a side view of a second coffee holder according to the present invention.
Figure 10:
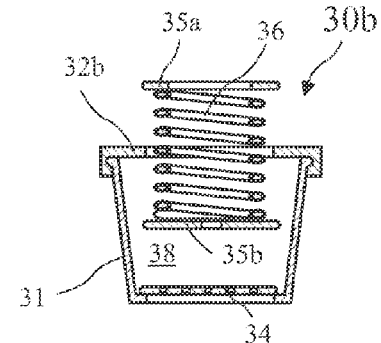
FIG. 10 is a cross-sectional side view of the second coffee holder according to the present invention taken along line 10-10 of FIG. 9.

A side view of a second coffee holder 30b according to the present invention is shown in FIG. 9 and a cross-sectional side view of the second coffee holder 30b taken along line 10-10 of FIG. 9 is shown in FIG. 10. The coffee holder 30b includes the holder body 31, a second holder lid 32b, a tamping spring 36, a spring washer 35a, and a top tamper 35b.

Figure 11A:
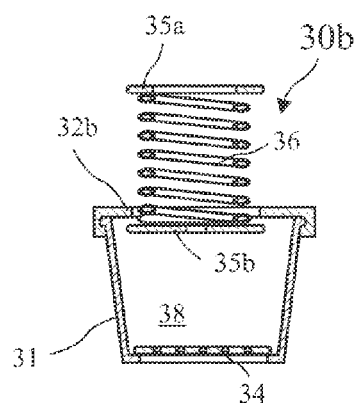
FIG. 11A is a cross-sectional side view of the second coffee holder according to the present invention taken along line 10-10 of FIG. 9 showing an empty coffee holder with the tamping spring and the top tamper according to the present invention.
Figure 11B:
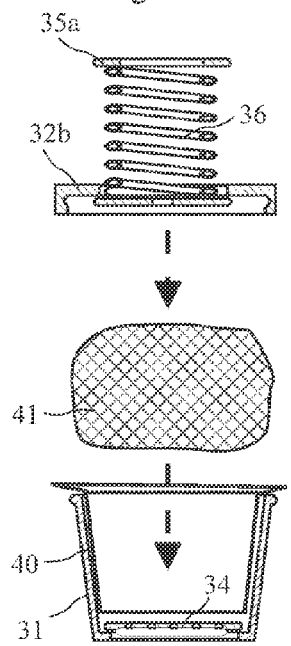
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
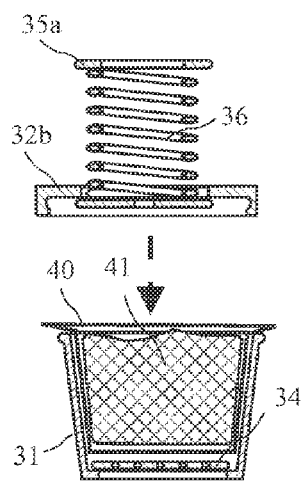
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
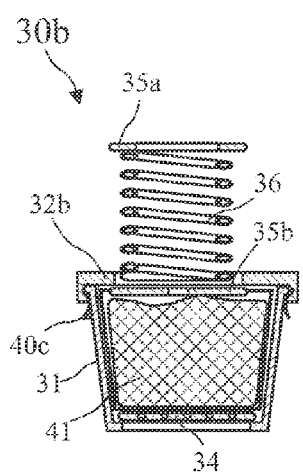
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30b taken along line 10-10 of FIG. 9 showing an empty coffee holder 30b is shown in FIG. 11A. A cross-sectional side view of the second coffee holder 30b taken along line 10-10 of FIG. 9 showing the holder lid 32b and a loose portion of coffee 41 above the empty coffee holder 30b is shown in FIG. 11B. A cross-sectional side view of the second coffee holder 30b taken along line 10-10 of FIG. 9 showing the holder lid 32b above the coffee holder 30b with the portion of loose coffee 41 in the coffee holder 32b is shown in FIG. 11C. A cross-sectional side view of the second coffee holder 32b taken along line 10-10 of FIG. 9 showing the coffee holder with the holder lid 32b attached to the coffee holder 30b and a portion of loose coffee 41 in the coffee holder 30b is shown in FIG. 11D. The tamping spring 36 extends upward out of the coffee holder 30b for tamping the loose coffee as disclosed hereafter.

Figure 12:
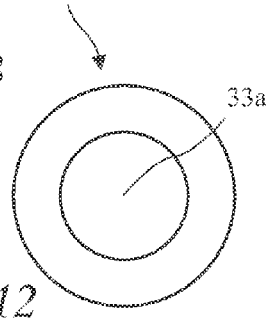
FIG. 12 is a top view of the second holder lid.

A top view of the second holder lid 32b is shown in FIG. 12. The holder lid 32b includes a larger passage 33a allowing passage of the tamping spring 36 through the holder lid 32b.

Figure 13:
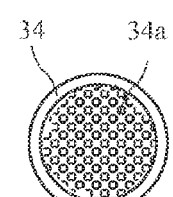
FIG. 13 is a top view of the bottom tamper.

A top view of the bottom tamper 34 is shown in FIG. 13. The bottom tamper 34 includes perforations 34a to allow coffee drink to pass through the bottom tamper 34.

The second coffee holder 30b is shown ready for insertion into the coffee maker 10 in FIG. 14A, the second coffee holder 30b is shown inserted into the coffee maker 10 before tamping the coffee 41 in FIG. 14B, and the second coffee holder 30b is shown in the coffee maker 10 after tamping the coffee 41 in FIG. 14C. The coffee maker 10 may include a long nozzle 19a to reach the top tamper 35b for "injection" of the heated water into the tamped coffee, but may also include the nozzle 19 and the heated water may pass through the coffee 41 under the pull of gravity.

A side view of a third coffee holder 30c according to the present invention is shown in FIG. 16 and a cross-sectional side view of the third coffee holder 30c taken along line 16-16 of FIG. 15 is shown in FIG. 16. The coffee holder 30c includes the holder body 31, the second holder lid 32b, the bottom tamper 34, and the top tamper 35b.

A cross-sectional side view of the third coffee holder 30c taken along line 16-16 of FIG. 15 showing the coffee holder 30c with the holder lid 32b, the top tamper 35b, and a portion of coffee, ready to attach to the holder 31, is shown in FIG. 17A. A cross-sectional side view of the third coffee holder taken along line 16-16 of FIG. 15 showing the coffee holder 30c with the holder lid 32b and the top tamper ready to attach, and a portion of coffee 41 in the coffee holder, is shown in FIG. 17B. A cross-sectional side view of the third coffee holder 30c taken along line 16-16 of FIG. 15 showing the coffee holder with the holder lid and the top tamper attached and a loose portion of coffee 41 in the coffee holder is shown in FIG. 17C. The coffee holder 30c is configured to use with a coffee make 10b (see FIGS. 18A-18C) including apparatus for entering the coffee holder for tamping the loose coffee 41.

Figure 18C:
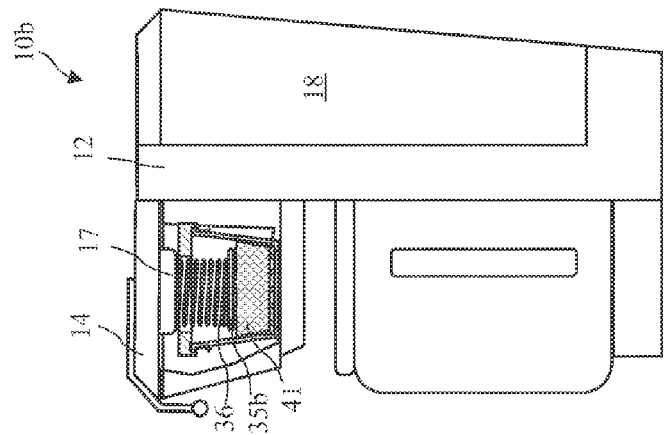
FIG. 18C shows the third coffee holder inserted into the coffee maker after tamping the coffee.
Figure 18B:
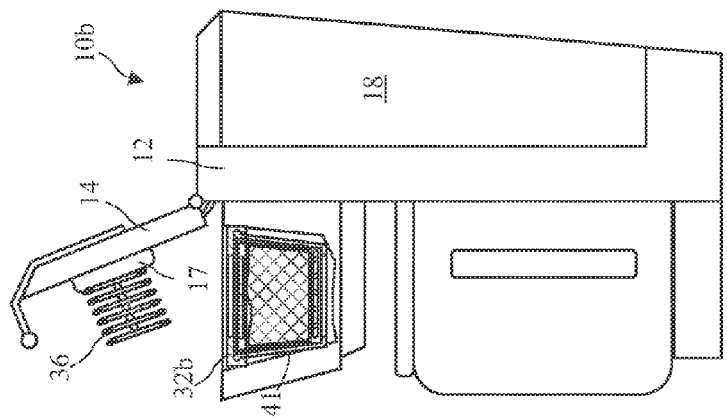
FIG. 18B shows the third coffee holder inserted into the coffee maker before tamping the coffee.
Figure 18A:
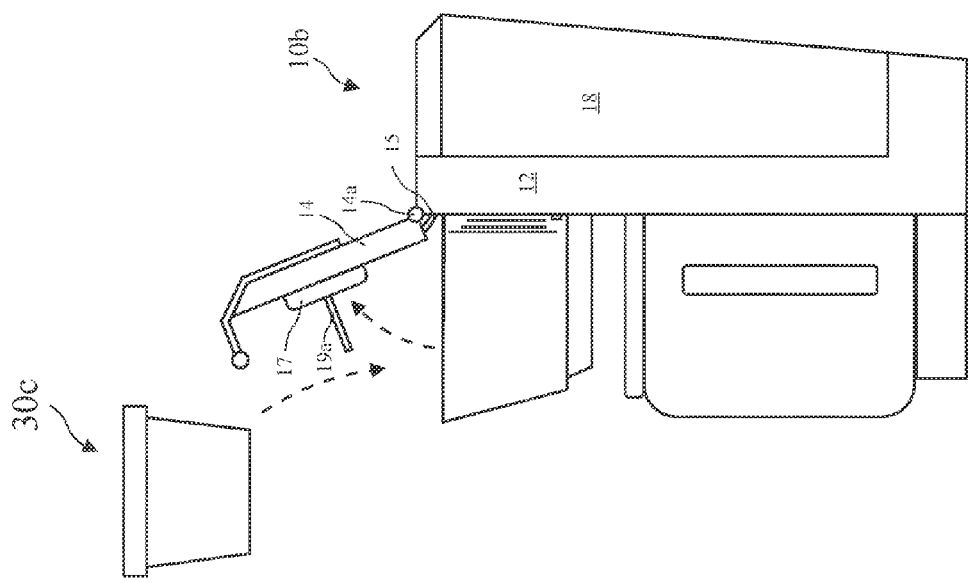
FIG. 18A shows the third coffee holder ready for insertion into a second coffee maker according to the present invention.

The third coffee holder 30c ready for insertion into a second coffee maker 10b in FIG. 18A, the third coffee holder 30c is shown residing in the coffee maker 10b before tamping the coffee 41 in FIG. 18B, and the third coffee holder 30c is shown residing in the coffee maker 10b after tamping the coffee 41 in FIG. 18C. The coffee maker 10b includes the tamping spring 36 attached to the pad 17 on the bottom of the lid 14. When the lid 14 is closed the tamping spring 36 enters the coffee holder 30c through the lid passage 33a (see FIG. 12) and pushes the top tamper 35b against the coffee 41 to tamp the coffee 41.

A side view of a fourth coffee holder 30d according to the present invention is shown in FIG. 19 and a cross-sectional side view of the fourth coffee holder 30d taken along line 20-20 of FIG. 19 is shown in FIG. 20. The coffee holder 30d includes the holder body 31, the first holder lid 32a, and the bottom tamper 34.

A cross-sectional side view of the fourth coffee holder 30d taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30d taken along line 20-20 of FIG. 19 showing the coffee holder 30d with the bottom tamper 34, the portion of coffee 41 in the coffee holder 30d, and the holder lid 32a ready to attach is shown in FIG. 21B. A cross-sectional side view of the fourth coffee holder 30d taken along line 20-20 of FIG. 19 showing the coffee holder 30d with the bottom tamper 34, a portion of coffee in the coffee holder 41, and the holder lid 32a is shown in FIG. 21C.

Figure 22C:
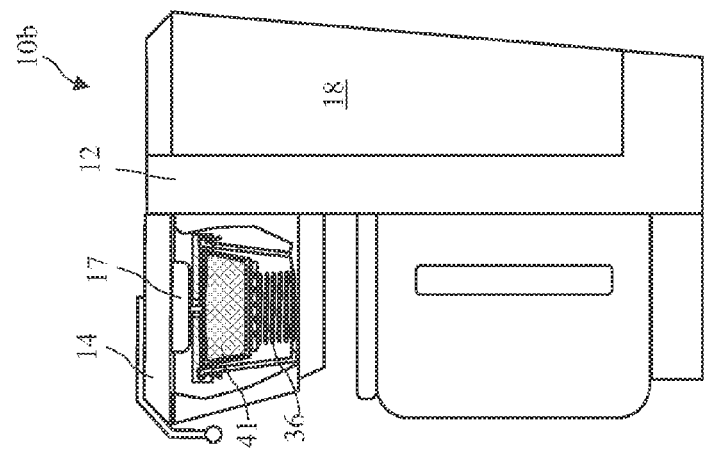
FIG. 22C shows the fourth coffee holder inserted into the coffee maker after tamping the coffee.
Figure 22B:
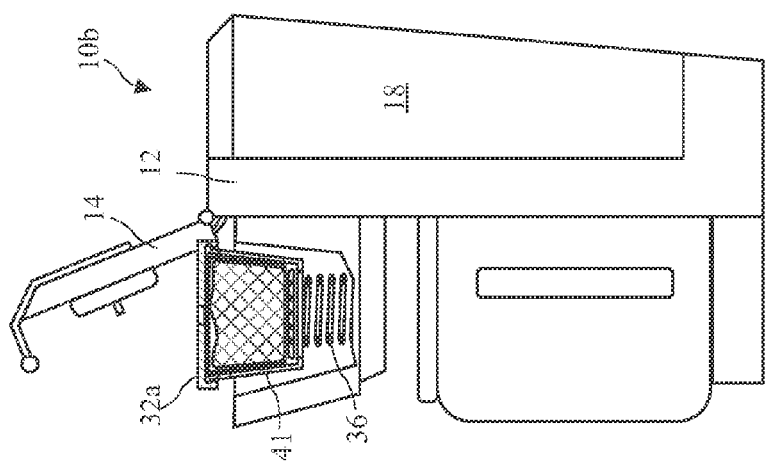
FIG. 22B shows the fourth coffee holder inserted into the coffee maker before tamping the coffee.
Figure 22A:
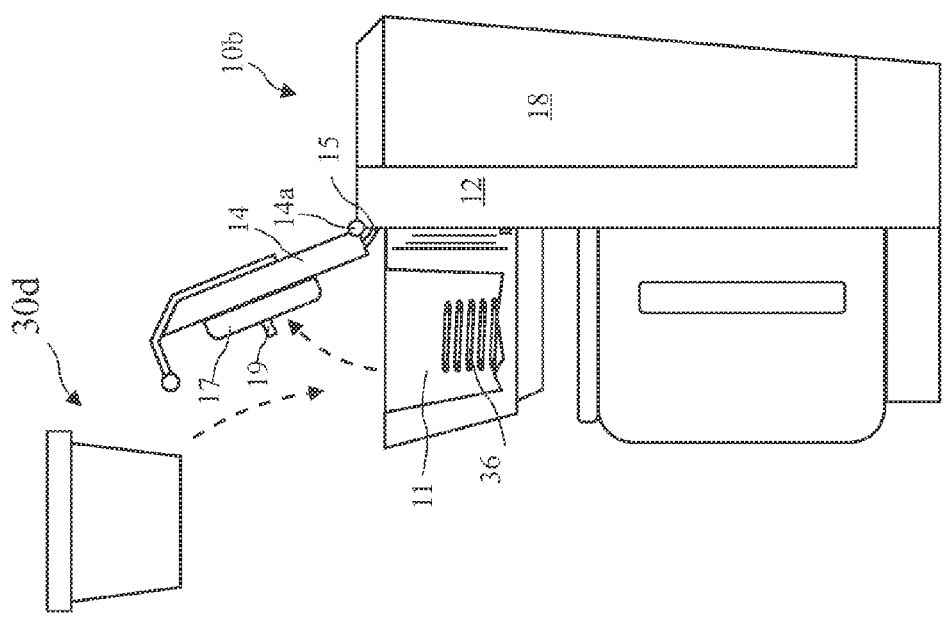
FIG. 22A shows the fourth coffee holder ready for insertion into the coffee maker.

The fourth coffee holder 30d ready for insertion into another embodiment of the second coffee maker 10b in FIG. 22A, the fourth coffee holder 30d is shown residing in the coffee maker 10b before tamping the coffee 41 in FIG. 22B, and the fourth coffee holder 30d is shown residing in the coffee maker 10b after tamping the coffee 41 in FIG. 22C. The coffee maker 10b may include the tamping spring 36 residing in the bottom of the coffee holder cavity 11. When the lid 14 is closed, the pad 17 pushed the coffee holder 30d down over the tamping spring 36 and the tamping spring 36 enters the coffee holder 30c through the bottom of the holder body 31 and pushes the bottom tamper 34 against the coffee 41 to tamp the coffee 41.

Figure 23A:
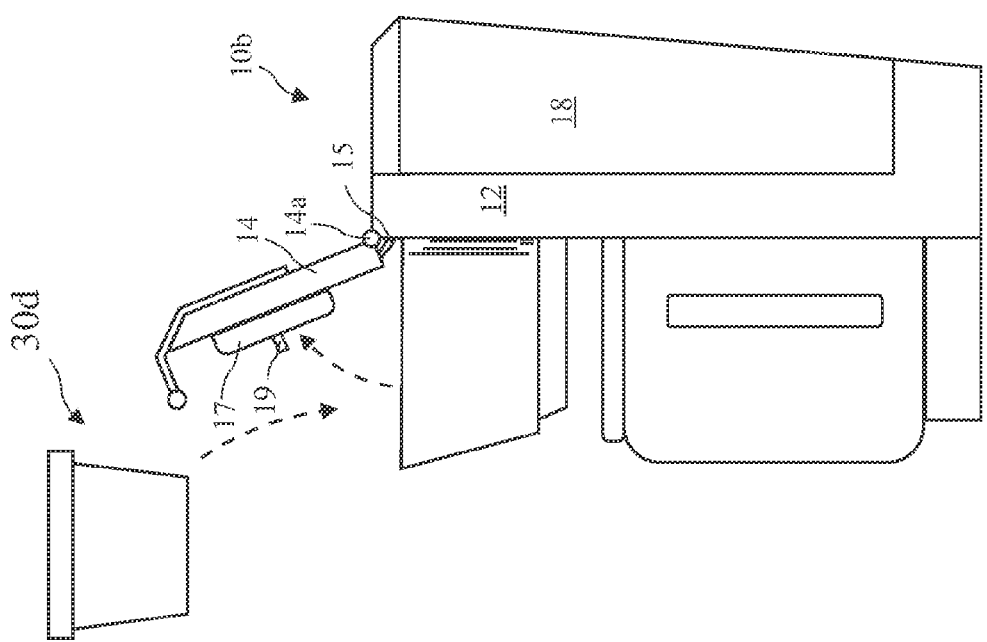
FIG. 23A shows the fourth coffee holder ready for insertion into the coffee maker having a tamping block according to the present invention.
Figure 23B:
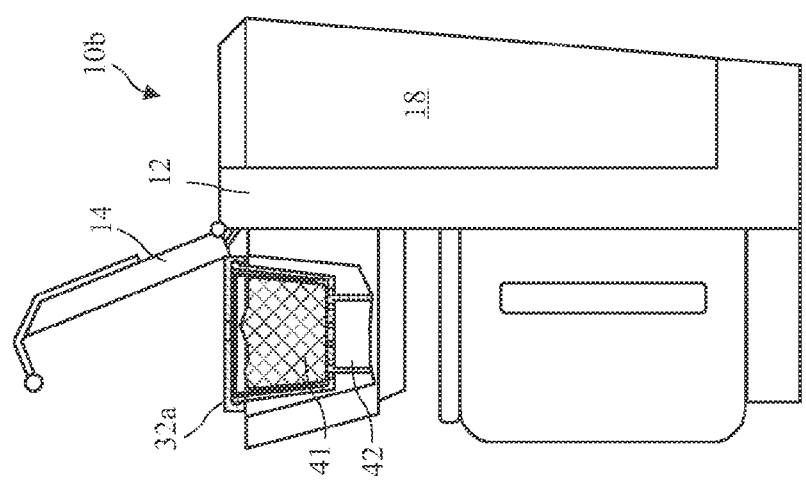
FIG. 23B shows the fourth coffee holder inserted into the coffee maker having the tamping block before tamping the coffee.
Figure 23C:
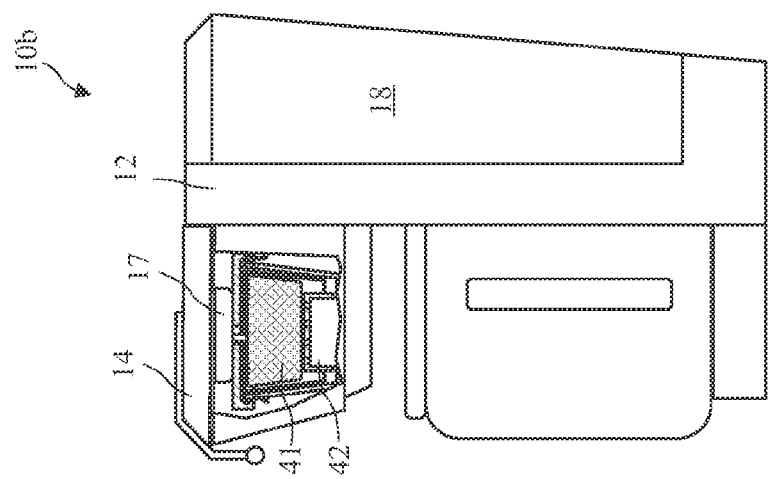
FIG. 23C shows the fourth coffee holder inserted into the coffee maker having the tamping block after tamping the coffee.

The fourth coffee holder 30d ready for insertion into another embodiment of the second coffee maker 10b in FIG. 23A, the fourth coffee holder 30d is shown residing in the coffee maker 10b before tamping the coffee 41 in FIG. 23B, and the fourth coffee holder 30d is shown residing in the coffee maker 10b after tamping the coffee 41 in FIG. 23C. The coffee maker 10b may include a resilient solid block 42 residing in the bottom of the coffee holder cavity 11. When the lid 14 is closed, the pad 17 pushed the coffee holder 30d down over the resilient solid block 42 and the resilient solid block 42 enters the coffee holder 30c through the bottom of the holder body 31 and pushes the bottom tamper 34 against the coffee 41 to tamp the coffee 41.

Figures 24, 25:
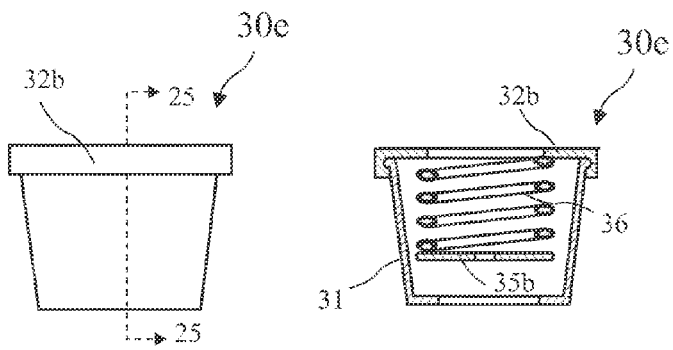
FIG. 24 is a side view of a fifth coffee holder according to the present invention.
FIG. 25 is a cross-sectional side view of the fifth coffee holder according to the present invention taken along line 25-25 of FIG. 24.

A side view of a fifth coffee holder 30e according to the present invention is shown in FIG. 24 and a cross-sectional side view of the fifth coffee holder 30e taken along line 25-25 of FIG. 24 is shown in FIG. 25. The fifth coffee holder 30e includes the holder body 31, the holder lid 32b, the tamping spring 36 and the top tamper 35b attached to the holder lid 32a.

Figures 26A, 26B, 26C:
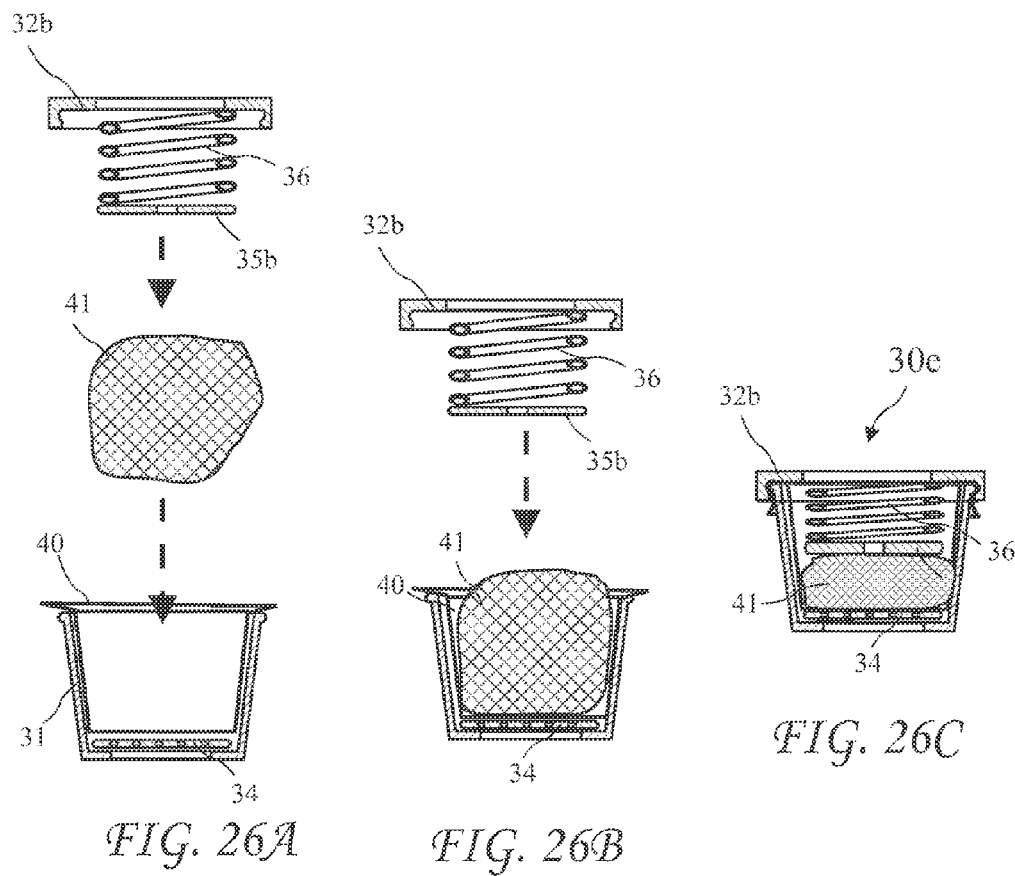
FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.
FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.
FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

A cross-sectional side view of the fifth coffee holder 30e taken along line 25-25 of FIG. 24 showing the coffee holder 30e with a portion of coffee 41, and the holder lid 32b with the top tamper 35b and tamping spring 36 attached, above the holder body 31, is shown in FIG. 26A. A cross-sectional side view of the fifth coffee holder 30e taken along line 25-25 of FIG. 24 showing the coffee holder with the portion of coffee 41 in the coffee holder, and the holder lid 32b with the top tamper 35b and tamping spring 36 attached, above the holder body 31, is shown in FIG. 26B. A cross-sectional side view of the fifth coffee holder 30e taken along line 25-25 of FIG. 24 showing the coffee holder 30e with the portion of coffee 41 in the coffee holder 30e, and the holder lid 32b with the top tamper 35b and tamping spring 36 attached to the holder base 31 is shown in FIG. 26D. The tamping spring 36 and top tamper 35b tamp the coffee 41 to provide a tamped coffee when the holder lid 32b is attached to the holder base 31.

A side view of a sixth coffee holder 30f according to the present invention is shown in FIG. 27 and a cross-sectional side view of the sixth coffee holder 30f taken along line 28-28 of FIG. 27 is shown in FIG. 28. The sixth coffee holder 30f includes the holder body 31 and a third holder lid 32c. The third holder lid 32c includes a recessed portion 32' which reaches into the interior of the sixth coffee holder 30f. The recessed portion 32' is preferably a solid resilient material.

A cross-sectional side view of the sixth coffee holder 30f taken along line 28-28 of FIG. 27 showing the sixth coffee holder 30f with a portion of coffee 41, and the holder lid 32c, above the holder body 31, is shown in FIG. 29A. A cross-sectional side view of the sixth coffee holder 30f taken along line 28-28 of FIG. 27 showing the coffee holder with the portion of coffee 41 in the coffee holder, and the holder lid 32c above the holder body 31, is shown in FIG. 29B. A cross-sectional side view of the sixth coffee holder 30f along line 28-28 of FIG. 27 showing the sixth coffee holder 30f with the portion of coffee 41 in the coffee holder 30e, and the holder lid 32e attached to the holder base 31 is shown in FIG. 26D. A cushion 32' tamps the coffee 41 to provide a tamped coffee when the holder lid 32e is attached to the holder base 31. The cushion 32' is preferably made from a resilient material to cushion the tamping of the loose coffee.

A side view of a seventh coffee holder 30g according to the present invention is shown in FIG. 30 and a cross-sectional side view of the seventh coffee holder 30g taken along line 31-31 of FIG. 30 is shown in FIG. 31. The seventh coffee holder 30g includes the holder body 31, the holder lid 32b, the tamping spring 36, and the bottom tamper 34 inside the holder base 31.

A cross-sectional side view of the seventh coffee holder 30g taken along line 31-31 of FIG. 30 showing the seventh coffee holder 30g with a portion of coffee 41 and the holder lid 32a above the holder body 31, and with the bottom tamper 34 and tamping spring 36 inside the holder base 31, is shown in FIG. 26A. A cross-sectional side view of the seventh coffee holder 30g taken along line 31-31 of FIG. 30 showing the coffee holder with the portion of coffee 41 in the filter paper 40 in the holder base 31 resting on the bottom tamper 34 supported by the tamping spring 36, and the holder lid 32a above the holder body 31, is shown in FIG. 26B. A cross-sectional side view of the seventh coffee holder 30g taken along line 31-31 of FIG. 30 showing the seventh coffee holder 30g with the portion of coffee 41 in the coffee holder 30e, and the holder lid 32a attached to the holder base 31, is shown in FIG. 26D. The tamping spring 36 and bottom tamper 34 tamp the coffee 41 upward against the tamper lid 32a to provide a tamped coffee when the holder lid 32a is attached to the holder base 31.

A side view of an eighth coffee holder 30h according to the present invention is shown in FIG. 33, a cross-sectional side view of the eighth coffee holder 30h taken along line 34-34 of FIG. 33 showing a portion of coffee 41 for placing inside the coffee holder and a fourth holder lid 32d with an insertable portion and an O-Ring 50 inside the coffee holder for sealing is shown in FIG. 34A, and a cross-sectional side view of the eighth coffee holder taken along line 34-34 of FIG. 33 showing the portion of coffee 41 inside the coffee holder 30h and the holder lid 32d with the insertable portion inserted into the coffee holder base 31a is shown in FIG. 34B. The filter paper 40 extends up above the O-ring 50 and the O-Ring 50 cooperates with the holder lid 32d to sandwich the top edge of the filter paper 40 for sealing the filter paper 40 to reduce or prevent the coffee 41 from escaping when the flow of hot water is provided to the coffee holder 30h. The holder base 31a is preferably cylindrical but may also be conical in shape.

A side view of a ninth coffee holder 30i according to the present invention is shown in FIG. 35, a cross-sectional side view of the ninth coffee holder 30i taken along line 36-36 of FIG. 35 showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h. The holder base 31b is preferably cylindrical to facilitate having internal threads, and at least the threaded portion is preferably cylindrical.

Figure 37C:
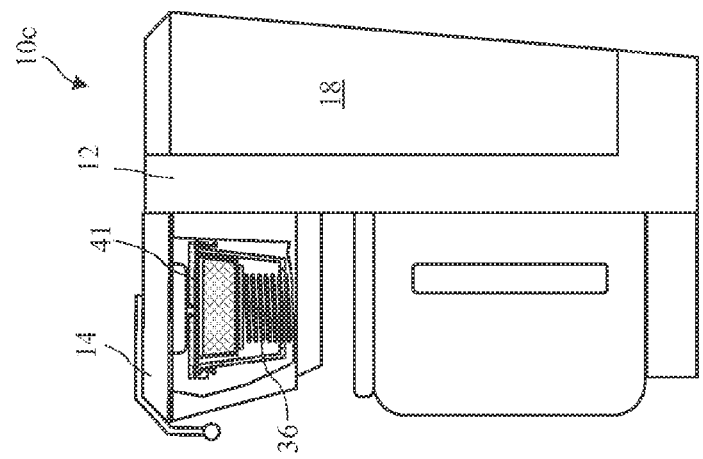
FIG. 37C shows the third coffee maker with the coffee holder holding the portion of tamped coffee with the coffee maker lid closed for tamping the coffee according to the present invention.
Figure 37B:
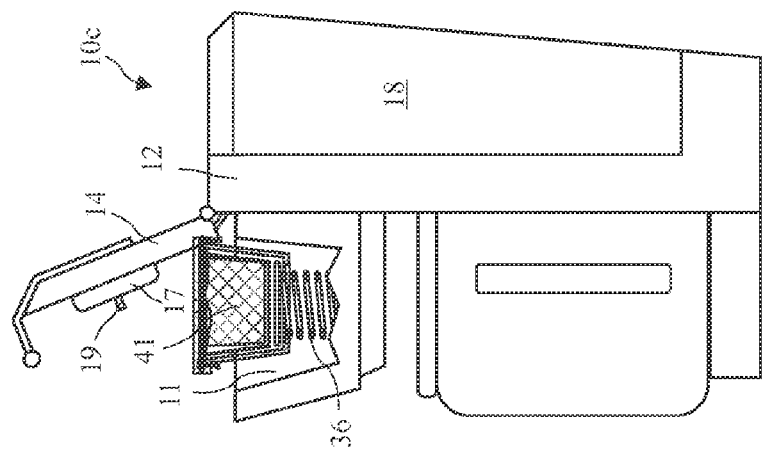
FIG. 37B shows the third coffee maker with the coffee holder holding the portion of coffee and the tamping spring under the coffee holder according to the present invention for tamping the coffee when the coffee maker lid is closed.
Figure 37A:
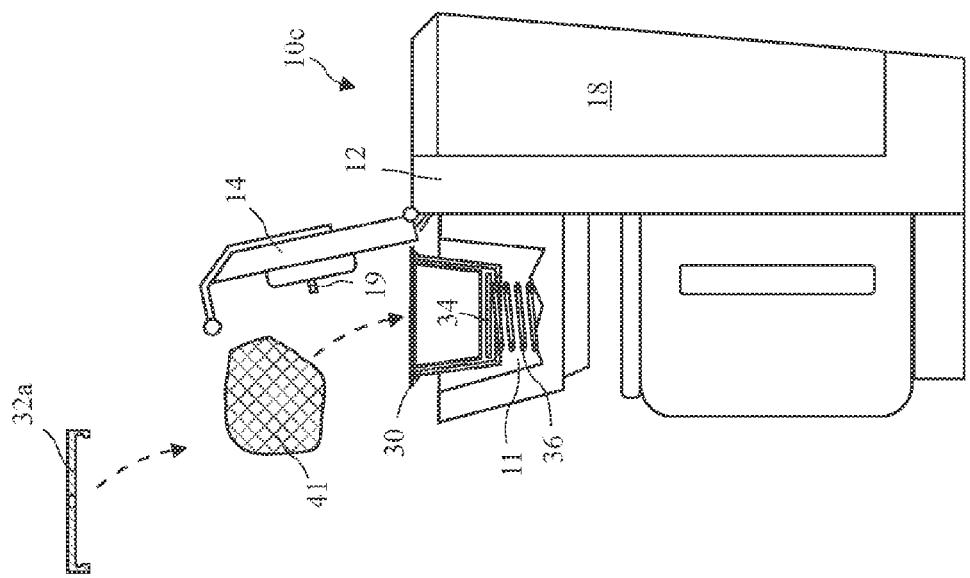
FIG. 37A shows a third coffee maker having a coffee holder for receiving a portion of coffee and tamping spring according to the present invention for tamping the coffee when the coffee maker lid is closed.

A third coffee maker 10c having a coffee holder 30 according to the present invention for receiving a portion of coffee and a tamping spring 36 for tamping the coffee is shown in FIG. 37A, the third coffee maker 10c with the coffee holder 30 holding the portion of coffee 41 is shown in FIG. 37B, and the third coffee maker 10c with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32a to the holder 30 is preferred in order to prevent coffee grounds from escaping the holder 30, the coffee maker 10c may also be used without the lid 32a and the pad 17 may serve to seal the coffee 41 in the holder 30. In this instance, the coffee maker lid 14 serves as a coffee holder lid.

Figure 38C:
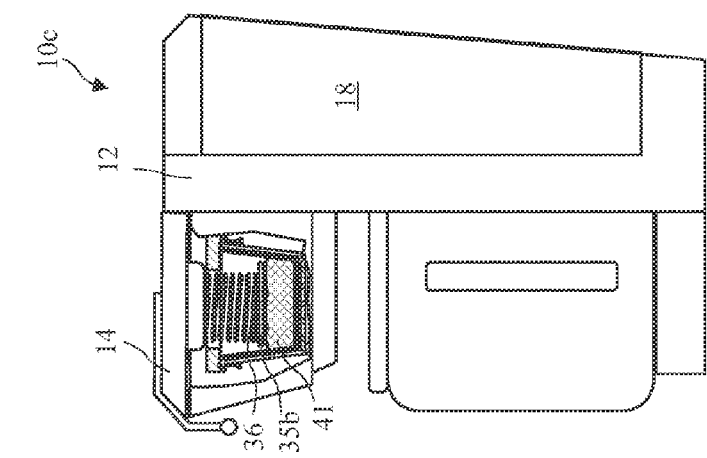
FIG. 38C shows the third coffee maker with the coffee holder holding the portion of tamped coffee with the coffee maker lid closed to push the tamping spring into the coffee holder for tamping the coffee according to the present invention.
Figure 38B:
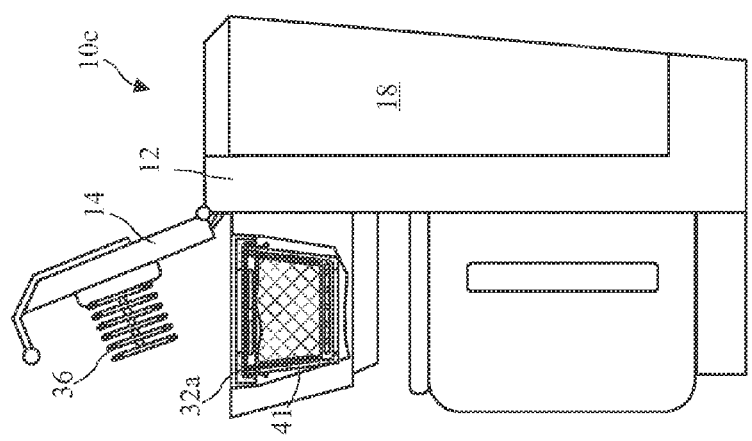
FIG. 38B shows the third coffee maker with the coffee holder holding the portion of untamped coffee according to the present invention for tamping the coffee when the coffee maker lid is closed.
Figure 38A:
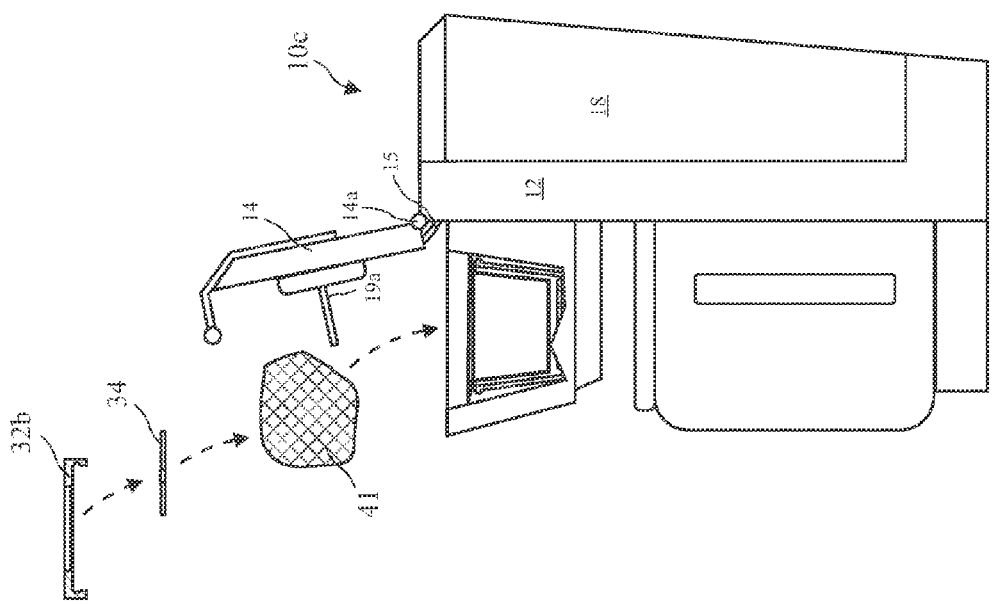
FIG. 38A shows a third coffee maker having a coffee holder for receiving a portion of coffee and tamping spring attached to the coffee maker lid according to the present invention for tamping the coffee when the coffee maker lid is closed.

A third coffee maker 10c having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10c with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10d having a third holder base 31c for receiving a packet 41a containing untamped coffee, a knife 50 for cutting the packet 41a open, and tamping spring 36 under the holder base 31c according to the present invention for tamping the coffee when the coffee maker lid is closed is shown in FIG. 39A, the fourth coffee maker 10d with the holder base 31c holding the packet 41a of untamped coffee is shown in FIG. 39B, and fourth coffee maker with the holder base 31c holding the packet of tamped coffee 41c with the coffee maker lid 14 closed to push the holder base down over the tamping spring 36 for tamping the coffee is shown in FIG. 39C. The coffee maker 10d includes a somewhat pointed nozzle 19b to puncture the packet 41a to provide the flow of hot water to the tamped coffee in the packet 41a. Known coffee packets include internal filters to allow a flow of hot water through the packet to make the coffee drink while preventing coffee grounds from escaping. The cut in the packet 41a made by the knife 50 allows the coffee drink to escape from the packet while filter material in the packet 41a prevent coffee grounds from escaping. The tamping spring 36 may also be attached to the lid 14 as in FIGS. 38A-38C.

The packet 41a may be an air tight pod containing coffee in filter paper and positioning the knife on the side of the holder base 31c results in less likelihood of the knife 50 cutting the filter paper. The packet 41a is preferably air tight to maintain coffee freshness and may be plastic, metal foil, or other air tight material which is sufficiently flexible to allow the coffee contained in the packet 41a to be tamped. Alternatively, the knife 50 may be eliminated when the packet 41a is configured to burst under pressure to expose the coffee, for example, when the coffee maker tamps the coffee, the packet 41a also bursts. In one embodiment, filter paper 41 is inserted into the holder base 31c without the knife 50, and the packet 41a bursts during compacting to release the coffee into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the coffee contained in the cup or capsule.

Figure 40C:
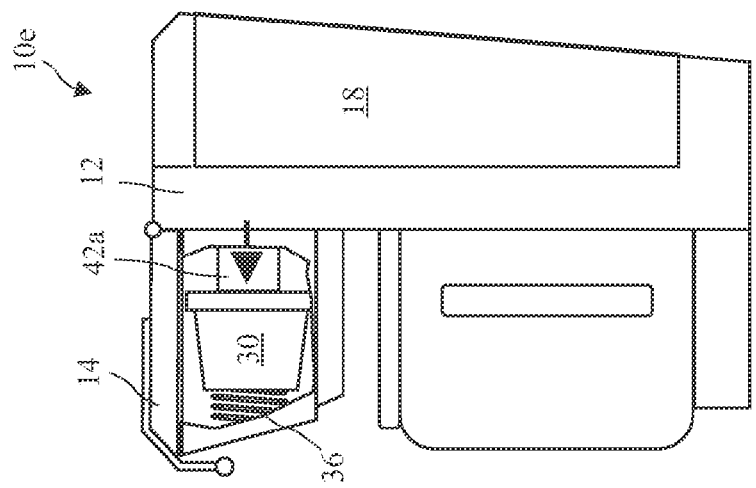
FIG. 40C shows the fifth coffee maker with the coffee holder residing horizontally in the coffee holder cavity with the coffee maker lid closed and the coffee holder pushed against the tamping spring for tamping the coffee, according to the present invention.
Figure 40B:
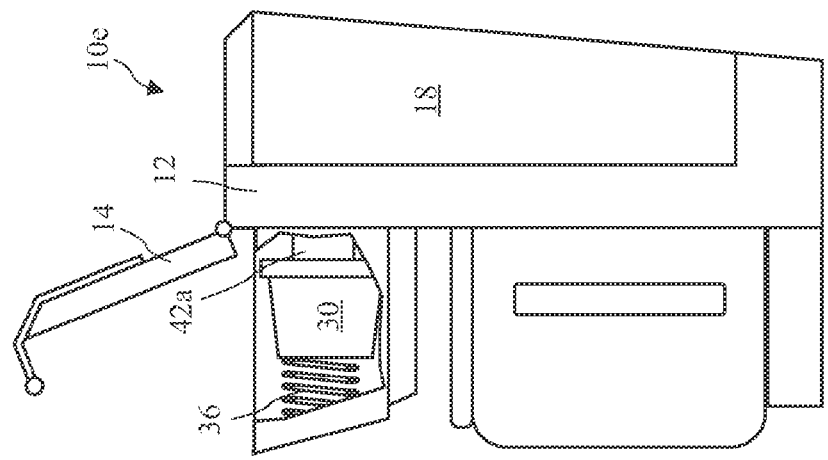
FIG. 40B shows the fifth coffee maker with the coffee holder residing horizontally in the coffee holder cavity according to the present invention for tamping the coffee when the coffee maker lid is closed.
Figure 40A:
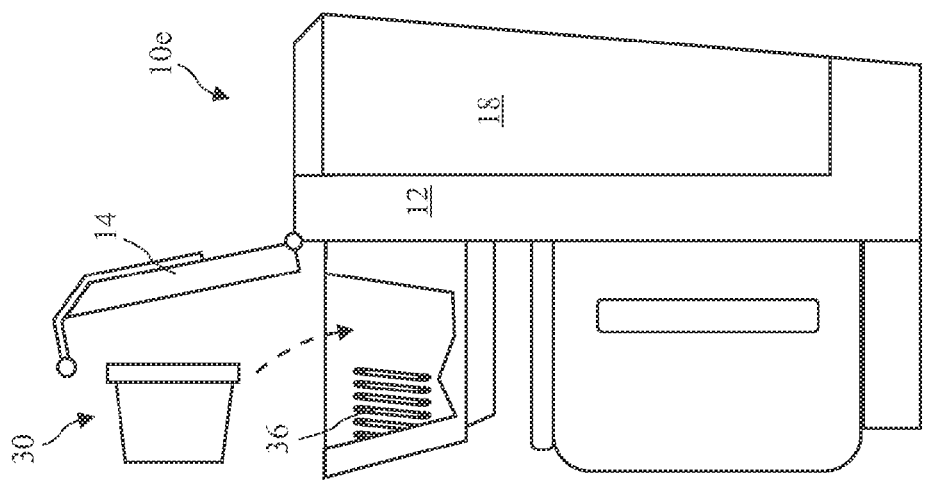
FIG. 40A shows a fifth coffee maker accepting a horizontal coffee holder and tamping spring residing horizontally in a coffee holder cavity according to the present invention for tamping the coffee when the coffee maker lid is closed.

A fifth coffee maker 10e for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10d may alternatively include a tamping spring entering the coffee holder top, or a resilient solid block pushed into the coffee holder 30 to tamp the coffee. Preferably, a horizontal ram 42a is actuated when the lid 14 is closed and pushed the coffee holder 30 against the spring 36 to tamp the coffee. The horizontal ram 42a may actuated by an electrical solenoid, by pressure, or by mechanical levers connected to the lid 14. The fifth coffee maker 10e may further include any of the features described above for other embodiments of the coffee maker according to the present invention and may be configured to use any of the coffee holders described above according to the present invention.

A side view of a tenth coffee holder 30j with straight walls according to the present invention is shown in FIG. 41, and a cross-sectional view of the tenth coffee holder 30*j* taken along line 42-42 of FIG. 41 showing an empty coffee holder is shown in FIG. 42. The coffee holder 30*j* provides straight cylindrical inside walls allowing a better fit between the top tamper 35*b* and the inside walls to reduce or eliminate coffee 41 escaping past the top tamper 35*b* during tamping.

A cross-sectional view of the tenth coffee holder 30*j* taken along line 42-42 of FIG. 41 showing a full and tamped coffee holder is shown in FIG. 43. The tamping spring 36 has been pushed down by the lid 32*b* to tamp the coffee 41.

A side view of an eleventh coffee holder 30*k* with straight walls according to the present invention is shown in FIG. 44, a cross-sectional view of the eleventh coffee holder 30*k* taken along line 45-45 of FIG. 44 showing an empty coffee holder is shown in FIG. 45, and a cross-sectional view of the eleventh coffee holder 30*k* taken along line 45-45 of FIG. 41 showing a full and tamped coffee holder. As with the coffee holder 30*j*, the coffee holder 30*k* provides straight cylindrical inside walls allowing a better fit between the lid 32*f* and the inside walls to reduce or eliminate coffee 41 escaping past the lid 32*f* during tamping. The lid 32*f* may be used with or without the top tamper 35*b*.

A side view of a top tamper 35*b* is shown in FIG. 47A and a top view of the top tamper 35B is shown in FIG. 47B. A side view of the top tamper 35*b'* with a seal 60 according to the present invention is shown in FIG. 47C and a top view of the top tamper 35*b'* with the seal 60 is shown in FIG. 47D. In some instances, for example with a very fine ground coffee, an amount of coffee may escape past the top tamper 35*b*. In such instances, a user may prefer to use the top tamper 35*b'* with the seal 60 to reduce or eliminate the escape of the coffee.

A perspective view of a filter paper cup 40' with a folding cup lid 40*d* is shown in FIG. 48 (also see FIG. 7C). The cup lid 40*d* may be folded over the rim 40*c* to reduce or prevent coffee from escaping during tamping of subsequent processing. The lid 40*d* may also include a perforation 40*e* centered on the lid 40*d* allowing the nozzle 19 to enter and/or inject the hot flow of water into the tamped coffee 41, but in some embodiments, the lid 40*d* does not include the perforation 40*e*. The filter paper cup 40' may be used in the coffee containers described herein, and may able be used in a coffee machine having a cavity for receiving the filter paper cup 40'. While the cup 40' is preferably made from filter paper, the cup may also be made from a reusable mech.

Figure 49:
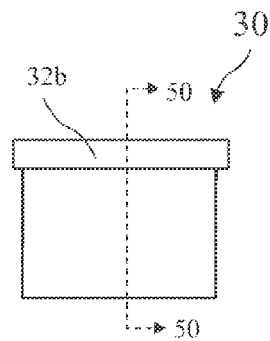
FIG. 49 is a side view of an twelfth coffee holder with straight walls according to the present invention.
Figure 50:
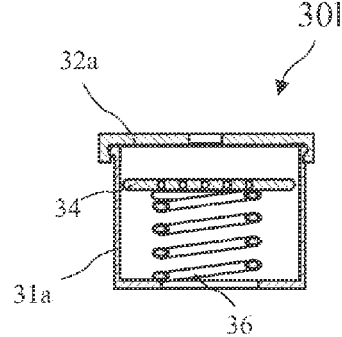
FIG. 50 is a cross-sectional view of the twelfth coffee holder taken along line 50-50 of FIG. 49 showing an empty coffee holder.

A side view of an twelfth coffee holder 30*l* with straight walls according to the present invention is shown in FIG. 49, and a cross-sectional view of the twelfth coffee holder 30*l* taken along line 50-50 of FIG. 49 showing an empty coffee holder is shown in FIG. 50. The twelfth coffee holder 30*l* includes a straight walled base and the tamping spring below the coffee, and additionally uses a filter paper cup 40' with the folding lid 40*d*.

Figure 51A:
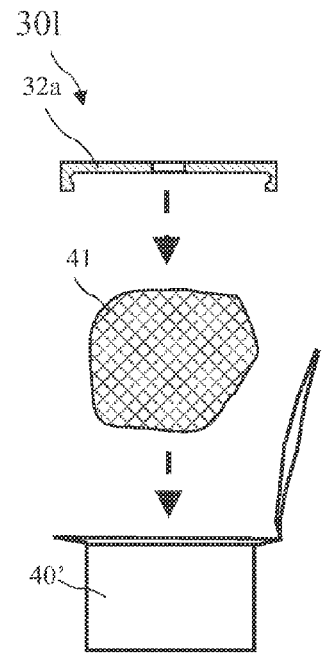
FIG. 51A is a cross-sectional view of the twelfth coffee holder taken along line 50-50 of FIG. 49 showing a lid, coffee, a filter paper cup, above the base, and the coffee holder base.
Figure 51B:
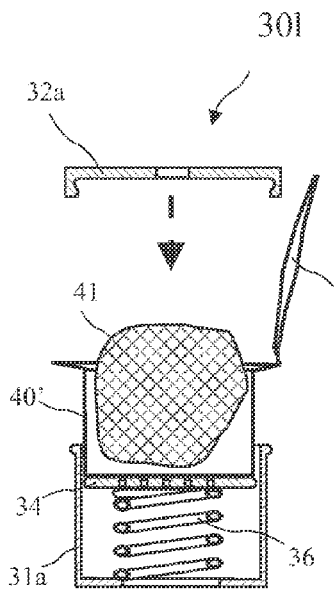
FIG. 51B is a cross-sectional view of the twelfth coffee holder taken along line 50-50 of FIG. 49 showing the lid, above the coffee and the filter paper cup resting in the coffee holder base.
Figure 51C:
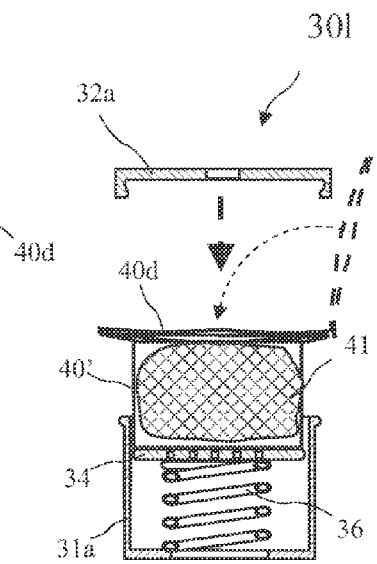
FIG. 51C is a cross-sectional view of the twelfth coffee holder taken along line 50-50 of FIG. 49 showing the lid, above the coffee and the filter paper cup resting in the coffee holder base with a filter paper cover folded over the coffee in the filter paper cup.
Figure 51D:
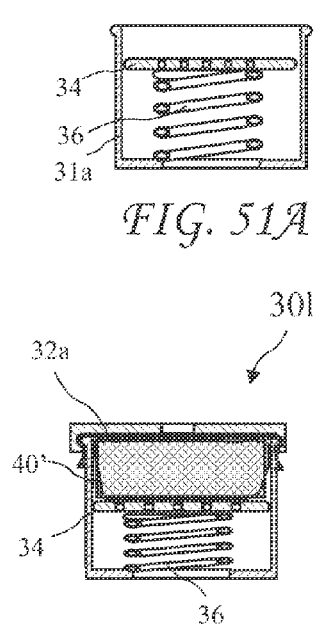
FIG. 51D is a cross-sectional view of the twelfth coffee holder taken along line 50-50 of FIG. 49 showing the lid attached to the base with the coffee and the filter paper cup residing in the coffee holder base with the coffee tamped.

A cross-sectional view of the twelfth coffee holder 30*l* taken along line 50-50 of FIG. 49 showing the lid 32*a*, coffee 41, the filter paper cup 40' with lid 40*d*, above the coffee holder base 31*a* is shown in FIG. 51A, a cross-sectional view of the twelfth coffee holder 30*l* taken along line 50-50 of FIG. 49 showing the lid 32*a*, above the coffee 41 and the filter paper cup 40' resting in the coffee holder base 31*a* is shown in FIG. 51B, a cross-sectional view of the twelfth coffee holder 30*l* taken along line 50-50 of FIG. 49 showing the lid 32*a*, above the coffee 41 and the filter paper cup 40' resting in the coffee holder base 31*a* with the filter paper cover 40*d* folded over the coffee 41 in the filter paper cup 40' is shown in FIG. 51C, and a cross-sectional view of the twelfth coffee holder 30*l* taken along line 50-50 of FIG. 49 showing the lid 32*a* attached to the base 31*a* with the coffee 41 and the filter paper cup 40' residing in the coffee holder base 31*a* with the coffee 41 tamped is shown in FIG. 51D. In embodiments with the coffee 41 partially exposed above the base 31*a*, some coffee 41 may escape during tamping. Using the filter paper cup 40' having the fold over paper lid 40*d* reduces or eliminates such escape of coffee 41 and additionally provides a drum like taut surface for consistent puncturing A side view of a thirteenth coffee holder 30*m* with a releaseable tamping latch 64 according to the present invention is shown in FIG. 52 and a cross-sectional view of the thirteenth coffee holder 30*m* taken along line 53-53 of FIG. 52 showing an empty coffee holder is shown in FIG. 53. The latch 64 is held in a latched position by a spring loaded lever 62 on the exterior of the base 31*a*.

A cross-sectional view of the thirteenth coffee holder 30*m* taken along line 53-53 of FIG. 52 showing the lid 32*a*, coffee 41, the filter paper cup 40, above the base 31*a*, and the coffee holder base 31*a*, with the tamping latch 64 retaining the bottom tamper 34 is shown in FIG. 54A, a cross-sectional view of the thirteenth coffee holder 30*m* taken along line 53-53 of FIG. 52 showing the lid 32*a* above the coffee 41 and the filter paper cup 40 resting in the coffee holder base 31*a*, with the tamping latch 64 retaining the bottom tamper 34 is shown in FIG. 54B, a cross-sectional view of the thirteenth coffee holder 30*m* taken along line 53-53 of FIG. 52 showing the lid 32*a*, above the coffee 41 and the filter paper cup 40 resting in the coffee holder base 31*a* with the tamping latch 64 retaining the bottom tamper 34 is shown in FIG. 54C, and a cross-sectional view of the fourteenth coffee holder 30*m* taken along line 53-53 of FIG. 52 showing the lid 32*a* attached to the base 31*a* with the coffee 41 and the filter paper cup 40 residing in the coffee holder base 31*a* with tamping latch 64 released and the coffee 41 tamped is shown in FIG. 54D. The lever 62 thus holds the latch 64 until the lever 62 is pushed to release the latch 62 to release the bottom tamper 34 to tamp the coffee 41.

Figure 55:
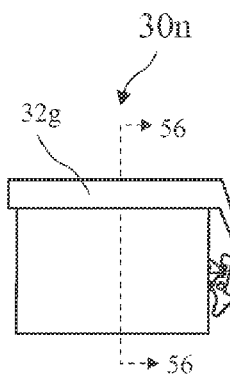
FIG. 55 is a side view of a fourteenth coffee holder with a releaseable tamping latch according to the present invention.
Figure 56:
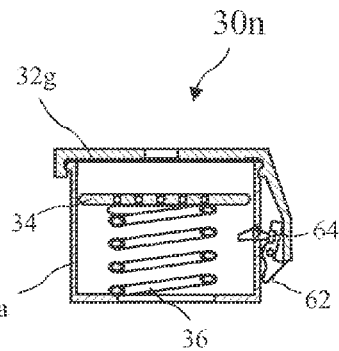
FIG. 56 is a cross-sectional view of the fourteenth coffee holder taken along line 56-56 of FIG. 55 showing an empty coffee holder.

A side view of a fourteenth coffee holder 30*n* with a releaseable tamping latch 64 according to the present invention is shown in FIG. 55 and a cross-sectional view of the fourteenth coffee holder taken along line 56-56 of FIG. 55 showing an empty coffee holder is shown in FIG. 56. The lever 62 holds the latch 64 until the arm 66 attached to the lid 32*g* pushes the lever 62 to release the latch 64.

Figure 57A:
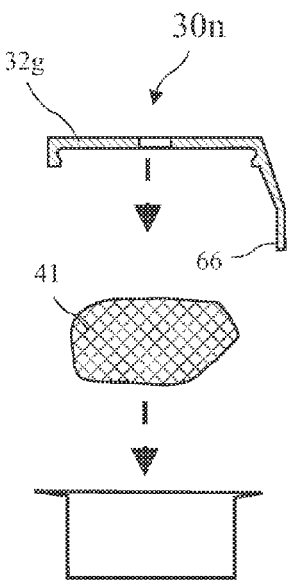
FIG. 57A is a cross-sectional view of the fourteenth coffee holder taken along line 56-56 of FIG. 55 showing a lid, coffee, a filter paper cup, above the base, and the coffee holder base, with the tamping latch retaining the bottom tamper.
Figure 57B:
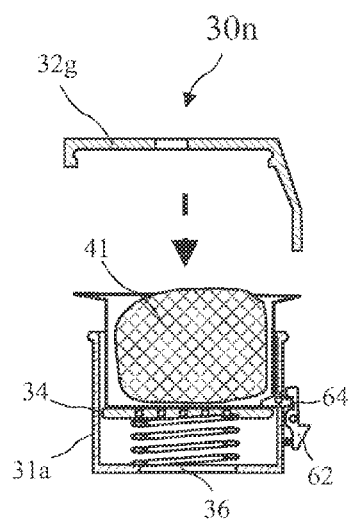
FIG. 57B is a cross-sectional view of the fourteenth coffee holder taken along line 56-56 of FIG. 55 showing the lid, above the coffee and the filter paper cup resting in the coffee holder base, with the tamping latch retaining the bottom tamper.
Figure 57C:
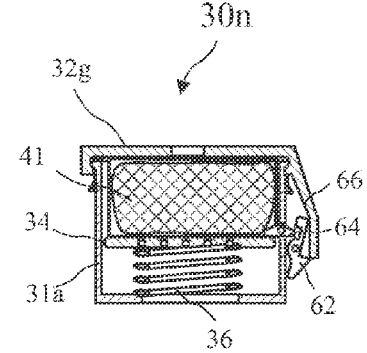
FIG. 57C is a cross-sectional view of the fourteenth coffee holder taken along line 56-56 of FIG. 55 showing the lid, above the coffee and the filter paper cup resting in the coffee holder base, with the tamping latch released but just prior to tamping.
Figure 57D:
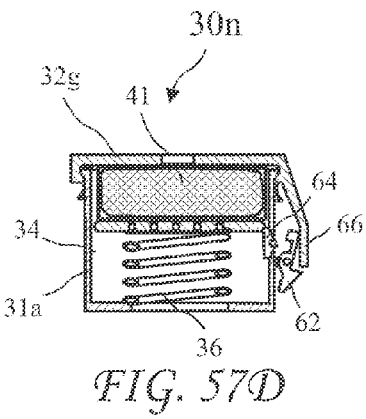
FIG. 57D is a cross-sectional view of the fourteenth coffee holder taken along line 56-56 of FIG. 55 showing the lid attached to the base with the coffee and the filter paper cup residing in the coffee holder base with tamping latch released and the coffee tamped.

A cross-sectional view of the fourteenth coffee holder 30*n* taken along line 56-56 of FIG. 55 showing the lid 32*g*, coffee 41, and the filter paper cup 40, above the coffee holder base 31*a*, with the tamping latch 64 retaining the bottom tamper 34 is shown in FIG. 57A, a cross-sectional view of the fourteenth coffee holder 30*n* taken along line 56-56 of FIG. 55 showing the lid 32*g* above the coffee 41 and the filter paper cup 40 resting in the coffee holder base 31*a*, with the tamping latch 64 retaining the bottom tamper 34 is shown in FIG. 57B, a cross-sectional view of the fourteenth coffee holder 30*n* taken along line 56-56 of FIG. 55 showing the lid 32*g*, above the coffee 41 and the filter paper cup 40 resting in the coffee holder base 31*a* with the tamping latch 64 released but just prior to tamping (the bottom tamper has been released but has not moved upward against the coffee 41) is shown in FIG. 57C, and a cross-sectional view of the fourteenth coffee holder 30*n* taken along line 56-56 of FIG. 55 showing the lid 32*g* attached to the base with the coffee 41 and the filter paper cup 40 residing in the coffee holder base 31*a* with tamping latch 64 released and the coffee 41 tamped is shown in FIG. 57D. The lever 62 thus holds the latch 64 until the lever 62 is pushed by the arm 66 to release the latch 64 to release the bottom tamper 34 to tamp the coffee 41.

Figure 58:
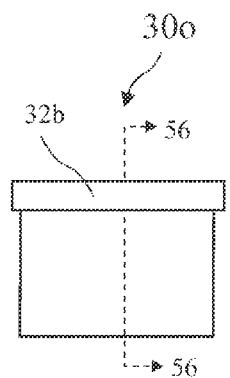
FIG. 58 is a side view of a fourteenth coffee holder with a releaseable tamping lock according to the present invention.
Figure 59:
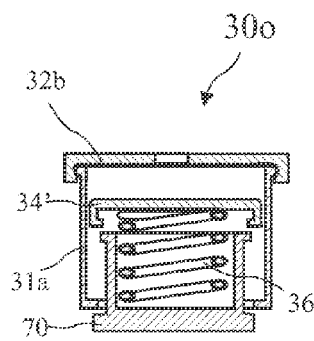
FIG. 59 is a cross-sectional view of the fourteenth coffee holder taken along line 59-59 of FIG. 58 showing an empty coffee holder.

A side view of a fourteenth coffee holder 30o with a releaseable tamping lock according to the present invention is shown in FIG. 58 and a cross-sectional view of the fourteenth coffee holder 30o taken along line 59-59 of FIG. 58 showing an empty coffee holder is shown in FIG. 59. The coffee holder 30o includes a tamping lock 70 which engages a second bottom tamper 34' to hold the second bottom tamper in a down position for filling the coffee holder with coffee and releases the bottom tamper 34' to be pushed upwards by the tamping spring 36 to tamp the coffee after the holder lid 32b is attached to the base 31a.

Figure 60A:
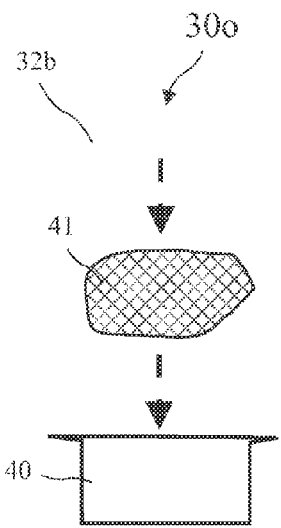
FIG. 60A is a cross-sectional view of the fourteenth coffee holder taken along line 59-59 of FIG. 58 showing a lid, coffee, a filter paper cup, above the base, and the coffee holder base, with the tamping lock retaining the bottom tamper.
Figure 60B:
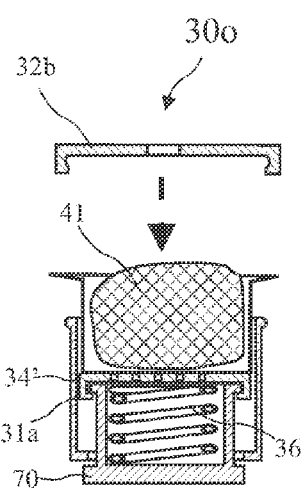
FIG. 60B is a cross-sectional view of the fourteenth coffee holder taken along line 59-59 of FIG. 58 showing the lid, above the coffee and the filter paper cup resting in the coffee holder base, with the tamping lock retaining the bottom tamper.
Figure 60C:
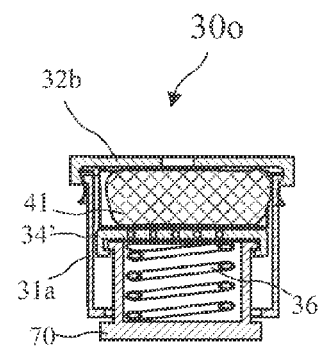
FIG. 60C is a cross-sectional view of the fourteenth coffee holder taken along line 59-59 of FIG. 58 showing the lid, above the coffee and the filter paper cup resting in the coffee holder base prior to tamping.
Figure 60D:
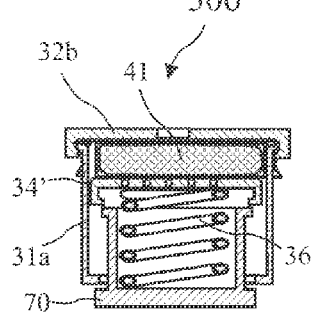
FIG. 60D is a cross-sectional view of the fourteenth coffee holder taken along line 59-59 of FIG. 58 showing the lid attached to the base with the coffee and the filter paper cup residing in the coffee holder base with tamping lock released and the coffee tamped.

A cross-sectional view of the fourteenth coffee holder 30o taken along line 59-59 of FIG. 58 showing a lid 32b, coffee 41, a filter paper cup 40, above the coffee holder base 31, with the tamping lock 70 retaining the bottom tamper 34' is shown in FIG. FIG. 60A, cross-sectional view of the fourteenth coffee holder taken along line 59-59 of FIG. 58 showing the lid, above the coffee and the filter paper cup resting in the coffee holder base, with the tamping latch retaining the bottom tamper 34' is shown in FIG. FIG. 60B, a cross-sectional view of the fourteenth coffee holder taken along line 59-59 of FIG. 58 showing the lid, above the coffee and the filter paper cup resting in the coffee holder base prior to tamping is shown in FIG. 60A, and a cross-sectional view of the fourteenth coffee holder taken along line 59-59 of FIG. 58 showing the lid 32b attached to the base 31a with the coffee 41 and the filter paper cup 41 residing in the coffee holder base 31a with tamping lock released and the coffee tamped is shown in FIG. 60D.

Figure 61A:
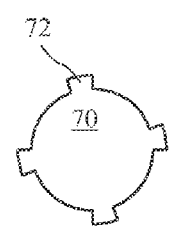
FIG. 61A is a top view of a lock according to the present invention.
Figure 61B:
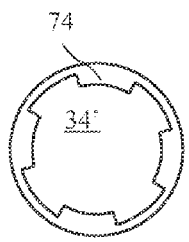
FIG. 61B is a bottom view of a second bottom tamper with cooperates with the tamping lock according to the present invention.

A top view of a tamping lock 70 according to the present invention is shown in FIG. 61A and a bottom view of a second bottom tamper 34' which cooperates with the tamping lock 70 according to the present invention is shown in FIG. 61B. The tamping lock 70 includes teeth 72 which are inserted between and turned to engage lips 74 on the bottom of the bottom tamper 34' to hold the bottom tamper in the down position for filling the coffee holder 30o with coffee 41. After the coffee holder 30o is filled with coffee and the holder lid 32b attached, the tam ping lock is twisted to release the bottom tamper 32b to tamp the coffee.

A pre-packaged rimmed brewing pod 41b for use in the coffee making according to the present invention is shown in FIG. 62A, a cut away view of the pre-packaged brewing material 41a for use in the coffee making showing the pod 41b is shown in FIG. 62B, and a coffee holder 30p having a window 77 is shown in FIG. 62C. The pod 41b is generally suitable for use in any of the coffee holders 30a-30o described above. The pod 41b further includes an identification feature 76 to provide information to the coffee maker to properly brew the specific brewing material 41 in the pod 41b. The rim of the pod 41b is captured by the lid of the coffee holder 30p thereby providing a drum like (or taut) surface for consistent puncturing by the pointed nozzle 19b (see FIGS. 39A-39C).

The pre-packaged rimmed brewing pod 41b is shown residing in a coffee holder 30p in FIG. 62D with the identification feature 76 cooperating with a sensor 78 residing in or near the cavity 11 of the coffee maker. The window 77 provides visual cooperation between the identification feature 76 and sensor 78.

A coffee holder 30q having the identification feature 76 affixed to the coffee holder 30q is shown in FIG. 62E and a cross-sectional view of the coffee holder 30q taken along line 62F-62F of FIG. 62E is shown in FIG. 62F. The feature 76 on the coffee holder 30q cooperates with the sensor 78 to identify that the coffee holder 30q is an adapter containing a single serving of brewing material, for example, a cartridge 41d sold under the trademark K-CUP or under the trademark VUE, or the like, or any pre-packaged or user prepared packaged brewing material.

In one embodiment directed for use with the cartridge 41d, the coffee holder 30q includes a passage for a top needle 19 to puncture the top of the cartridge 41a to inject liquid into the cartridge 41d, and a bottom needle 19c to puncture the bottom of the cartridge 41d to release beverage from the cartridge 41d. The removable and reusable lid 14 includes a permanent passage 33 allowing the needle 19 to enter the coffee holder 33q. The label 76 informs the coffee maker that the cartridge 41d is being used.

The identification feature 76 may be visual (for example any feature which may be read or a bar code), a readable magnetic strip, a Radio Frequency Identification (RFID), or any feature able to contain information and provide that information to a reader. The identification feature 76 may be read by a sensor 78 appropriately positioned in the cavity 11 of the coffee maker. The identification feature 76 may be on any surface of the pre-packaged brewing material 41a and in the instance of a visual identification feature 76, the window 77 may be positioned on the coffee holder 30p and the sensor may be positioned in the cavity 11 to correspond with the position of the visual identification feature 76. A window 77 is generally not required for a magnetic or RF identification feature 76 and the location of the corresponding sensor 78 generally only need be sufficiently near to the identification feature 76.

In another embodiment, a sensor 78 resides on the exterior of the coffee maker. A bulk brewing material container, a pre packaged pod, a coffee holder, a recipe book, or any apparatus carrying an identification feature, may be swept past the sensor or held against or near the sensor, to provide brewing information to the coffee maker.

A side view of a filter cup 80 according to the present invention is shown in FIG. 63A and a top view of the filter cup 80 is shown in FIG. 63B. The filter cup 80 includes a ring 84 made a of a material sufficiently strong to hold shape in the proposed use. Filter material 82 is attached to the ring 84. The filter cup 80 is insertable into the coffee holder and in many embodiments is a replacement for the filter paper cup 40.

A side view of multi-mode coffee maker 100 according to the present invention is shown in FIG. 64. The multi-mode coffee maker 100 allows the user to easily make a single cup of coffee or several cups of coffee. The multi-mode coffee maker 100 includes manually operated controls 102 for selecting a volume of water for a single cup of coffee or to fill a carafe, residing in the mouth 114 of the multi-mode coffee maker 100. The controls 102 may also allow selection of a large or small cup of coffee, and of hot water only. Alternatively, the multi-mode coffee maker 100 may detect the presence of a single cup adapter 118 and limit the volume of coffee produced to an amount for a single cup, for example as an override if a user accidentally selects a volume of coffee too large for a single cup.

A spout/drip valve 104 releases the desired amount of coffee into a carafe or coffee positioned on a platform 24, and a drip valve actuator (or valve lever) 106 is actuateable to open and close the spout/drip valve 104. In other examples, the drip valve actuator may be pneumatic, hydraulic, or electric, and may be any mechanical link which opens the spout/drip valve 104. The spout/drip valve 104 may further be manually opened by a user. For example, the spout/drip valve 104 is opened by placing the multi-cup brewed coffee container 26 in the coffee maker 100 and openable for use of the single cup brewed coffee container 116 by either a mechanical or electrically operated actuator or by positioning of the single cup adapter 118 for use of the single cup.

In another embodiment the spout/drip valve 104 is opened by the positioning of a single cup adapter into position for use of a single cup in the coffee maker, for example by an arm on the single cup adapter cooperating with a lever connected to the spout/drip valve, by an arm residing at the rear of the mouth, the single cup adapter pushing against the arm to open the spout/drip valve, or by any mechanical or electrical apparatus connected to the spout/drip valve and actuated by positioning the single cup adapter to use a single cup in the coffee maker. In still another embodiment the flow of brewed coffee is controlled by turning the pump 21 on and off, by controlling a boiler, or by controlling a valve preventing the flow of water to the coffee holder.

A hot plate 108 is recessed on the top surface of the platform 24 and the recess is larger than the footprint of the multi-cup brewed coffee container (or carafe) 26 allowing contact with the hot plate 108 for keeping a carafe at a minimum temperature. A passage 110 allows a finger 120 of a single cup adapter 118 (see FIG. 67B) to engage a switch 112 to turn off the hot plate 108 when the single cup adapter 118 is in use.

A front view of the multi-mode coffee maker 100 with a carafe 26 residing on the platform 24 for receiving a selected volume of coffee is shown in FIG. 65A and a side view of the multi-mode coffee maker 100 with the carafe 26 positioned for receiving a selected volume of coffee is shown in FIG. 65B. The top edge of the carafe 26 pushes the valve lever 106 upward opening the spout/drip valve 104 to allow the selected volume of coffee to flow into the carafe 26.

A front view of the multi-mode coffee maker 100 with a coffee cup (or single cup brewed coffee container) 116 residing on a single cup adapter 118 for receiving the selected volume of coffee is shown in FIG. 66A and a side view of the multi-mode coffee maker 100 with the coffee cup residing on the single cup adapter 118 for receiving the selected volume of coffee is shown in FIG. 66B. The single cup adapter 118 includes an upward reaching arm portion 118b (see FIG. 67B) which pushes the valve lever 106 upward opening the spout/drip valve 104 to allow the selected volume of coffee to flow into the coffee cup 116.

A front view of a single cup adapter 118 according to the present invention is shown in FIG. 67A, a side view of the single cup adapter 118 is shown in FIG. 67B, a top view of the single cup adapter 118 is shown in FIG. 67C, and a cross-sectional view of the single cup adapter 118 taken along line 68-68 of FIG. 67A is shown in FIG. 68. The single cup adapter 118 includes a base portion 118a which includes a single cup platform 129 for supporting the coffee cup 116 and a drip basin (or tray) 124 for catching and holding drops from the spout/drip valve 104. A grill 126 resides over the drip basin 124 and the coffee cup 116 rests on the grill 126. An arm portion 118b reaches up and an angled surface 128 at the top of the arm portion 118b cooperates with the valve lever 106 to open the spout/drip valve 104 when the single cup adapter 118 is positioned in the coffee maker 100. In another embodiment, the drip tray may be integrated into the coffee maker 100 and may pivot or slide into position under the coffee cup 116, for example, the single cup adapter 118 may have an open side or rear that the drip tray slides or pivots into.

A downward protrusion 122 on the bottom of the base portion 118a fits into a recess in the platform 24 to correctly position the single cup adapter 118 in the mouth 114 of the coffee maker 100, and to resist easy detachment of the single cup adapter 118 from the coffee maker 100. A rearward reaching finger 120 enters the passage 110 to actuate the switch 112 (see FIG. 64) to turn off the hot plate when the single cup adapter 118 is attached to the coffee maker 100. The finger 120 and switch 112 are one example of a means for turning off the hot plate 108 when the single cup adapter 118 is attached to the coffee maker 100. Other means include a magnet switch detecting the presence of the hot plate 108 in the single cup adapter 118 by the proximity of a magnet and piece of magnetically attractive metal or a second magnet, a switch in the platform, or even a manual switch, and a coffee maker according to the present invention with any switch for turning off the hot plate is intended to come within the scope of the present invention.

A side view of a second single cup adapter 118' according to the present invention is shown in FIG. 67D. The single cup adapter 118' is a compact version of the single cup adapter 118 and does not include the arm portion 118b. The single cup adapter 118' provide single serving functions through the insertion of the rearward reaching finger 120 into the coffee maker 100. These functions include shutting off the hot plate 108 (see FIG. 64), opens the open the spout/drip valve 104 to release brewed beverage, setting the coffee maker 100 to the single serving mode (limits the beverage to one to sixteen ounces).

A side view of a multi-serving dry coffee holder 130a according to the present invention for use in the multi-mode coffee maker 100 for making several cups of brewed coffee is shown in FIG. 69A and a side view of a single-serving dry coffee holder 130b according to the present invention for use in the multi-mode coffee maker 100 for making one cup of coffee is shown in FIG. 69B. A variety of dry coffee holders 30a-30o and means for containing and tamping dry coffee in a coffee maker are disclosed in FIGS. 3 though 63B, and a multi-mode coffee maker 100 including any of the coffee holders disclosed herein, or any other coffee holder, is intended to come within the scope of the present invention.

A coffee maker 210 and reuseable cartridge 230 according to the present invention are shown in FIG. 70, a side view of the reuseable cartridge 230, is shown in FIG. 71B, a top view of the reuseable cartridge 230 is shown in FIG. 71B, and a cross-sectional view of the reuseable cartridge according to the present invention taken along line 72-72 of FIG. 71B. The reuseable cartridge 230 comprises a cover 230a and a base 230b. The cover 230a is removeable from the base 230b to fill the reuseable cartridge 230 with brewing material 41. Generally, the reuseable cartridge 230 is filled by pouring loose coffee 41 into the base 230b. Once filled with the brewing material 41, the reuseable cartridge 230 is inserted into the cavity 211 of the coffee maker 210 and the lid 214 is closed. The lid 214 of the coffee maker 210 generally includes a projections 214a which engages recesses 236a of the cover 236 to urge the reuseable cartridge 230 into position in the cavity 211. A flow of water 232 (generally a flow of heated water) enters the reuseable cartridge 230, passes through the brewing material 41, and a flow of brewed beverage 234 exits the reuseable cartridge 230. An the identification feature 76 resides on a bottom surface providing the benefits described in FIGS. 62A-62E above. Such identification feature 76 may be attached other positions on the exterior of the reuseable cartridge 230.

A side view of a cover 230a of the reuseable cartridge 230 is shown in FIG. 73A, a top view of the cover 230a of the reuseable cartridge 230 is shown in FIG. 73B, and a cross-sectional view of the cover 230a of the reuseable cartridge 230 taken along line 74-74 of FIG. 73B. The cover includes recesses 236a and 236b.

A side view of a base 230b of the reuseable cartridge 230 is shown in FIG. 75A, a top view of the base 230b is shown in FIG. 75B, and a cross-sectional view of the base 230b taken along line 76-76 of FIG. 75B is shown in FIG. 76. The base 230b includes entry port 238a for the flow of water 232, and exit port 238b for the flow of brewed beverage 234. The flow of water 232 enters the base 230a and much climb over the wall 240 to reach the interior of the 244 of the base 230b. Forcing the flow of water 232 over the wall 240 causes the flow of water 232 to pass through the brewing material 41, thereby producing a rich brewed beverage. A filter 242 resides over the exit port 238b to prevent the brewing material 41 from escaping into a cup of brewed beverage.

A side view of a brewed beverage pod 250 for use in the reuseable cartridge 230 according to the present invention is shown in FIG. 77A and a top view of the brewed beverage pod 250 is shown in FIG. 77B. The brewed beverage pod 250 is shaped to conform reasonable well to the interior of the 244 of the base 230b and includes a passage 250a for the recess 236a in the cover 230a.

A side view of a filter paper 252 for use in the reuseable cartridge 230 according to the present invention is shown in FIG. 78A and a top view of the filter paper 252 is shown in FIG. 78B. The filter paper 252 is shaped to conform reasonable well to the interior of the 244 of the base 230b and includes a passage 252a for the recess 236a in the cover 230a. The filter paper 252 includes a filter cover 252'. After inserting the filter paper 252 into the base 230b and filling the filter paper 252 with brewing material 41, the filter cover 252' is folded over the brewing material 41 and the cover 230a is pressed onto the base 230b. A rim 253 of the filter paper 252, and matching rim 253' of the filter cover 252' may be sandwiched between the cover 230a and base 230b to securely hold the filter cover 252' on the filter paper 252 to retain the brewing material 41 in the filter paper 252.

A side view of the filter paper cup 40 with the folding paper lid 40d open is shown in FIG. 79A, a top view of the filter paper cup 40 is shown in FIG. 79B, a second side view of the filter paper cup 40 with the folding paper lid 40d closed is shown in FIG. 7C, and a cross-sectional view of the filter paper cup 40 taken along line 80-80 of FIG. 79B is shown in FIG. 80. The lid 40d of the filter paper cup 40 may be folded over the cup 40 and sealed after loose brewing material 41 is poured into the cup. The filter paper cup 40 includes a receptacle 40g formed from a bottom 40b, sides 40a, and a rim (or annular rim) 40c, and a cover (or lid) 40d for closing the receptacle 40g to capture brewing material in the filter paper cup 40. The filter paper cup 40 is formed using heat and/or moisture to form permanent folds (or pleats) 40f in the sides 40a and rim 40c of the filter paper cup 40 to add strength and rigidity to the filter paper cup 40 so that the filter paper cup 40 retains its shape after forming, and preferably, adhesive is applied to the rim 40c and/or the sides 40a to retain the pleats and add strength and rigidity to the filter paper cup 40. Preferably, the filter paper cup 40 is constructed from heat sealable filter paper having a heat reacting film on at least one side, which film causes the pleats to adhere to adjacent pleats when heat is applied following forming. The pleats in the rim 40c are generally continuations of the pleats in the sides 40a. The filter paper cup 40 may alternatively be corrugated to retain shape. The filter paper cup 40 thus has structure for maintaining a substantially (i.e., within the ability of the paper to maintain a shape) frusto-conical or cylindrical shape unlike known coffee pods with have no structure for maintaining shape and are pillow-like. U.S. patent application Ser. No. 11/392,893 filed Mar. 28, 2006 filed by the present inventor, discloses a similar filter paper cup forming a coffee pod. The '893 application is incorporated by reference above.

The filter paper cup 40 is preferable frusto-conical shaped or cylindrically shaped and more preferably frusto-conical shaped. The filter paper cup 40 has a base diameter D1, an inner top diameter D2, an outer top diameter (the diameter of the rim) D3, and a height H. The diameter D1 is preferably approximately 1.25 inches, the diameter D2 is preferably approximately 1.625 inches, the diameter D3 is preferably approximately 2.125 inches, and the height H is preferably approximately one inch. The rim 40c is thus approximately 0.25 inches wide. The lid 40d has approximately the same diameter D3 as the rim 40c.

The filter paper cup 40 may be sold in an empty state for filling by a user, or as a pre-packages single serving coffee pod. When sold for filling by the user, the filter paper cup 40 is preferably sold with the cover 40d attached to the rim 40c of the receptacle 40g. For example, the filter paper cup 40 may be made from a single piece of filter paper cut into two circular portions attached by a hinge 40h, or by two separately cut pieces of filter paper attached at the hinge 40h. The filter paper cup 40 may be sold as two pieces, where the cover 40d is detached from the receptacle 40g, but may be more difficult to use. A user may seal the cover 40d to the rim 40c of the receptacle 40g as disclosed in the '893 patent, or the cover 40d may be held to the receptacle 40g by sandwiching the filter paper cup 40 between a holder lid 32a and holder body 31. When the filter paper cup 40 is sold as a ready to use pod containing brewing material, the pod is generally manufactured using filter paper off two separate rolls as described below.

A cross-sectional side view of a pod holder 30r showing the pod holder 30r with the tamping spring 36 and bottom tamper 34, the filter paper cup 40 containing a portion of coffee 41, and the holder lid 32a ready to attach to a holder body 31a is shown in FIG. 81A, and a cross-sectional side view of the pod holder 30r the coffee holder with the tamping spring and bottom tamper, the portion of coffee in the filter paper cup, and the holder lid attached to the holder body with the rim of the filter paper cup sandwiched between the lid and coffee holder and the tamping spring and bottom tamper pushing the filter paper cup against the lid according to the present invention is shown in FIG. 81B. The rim 40c rests on a top edge of the holder body 31 and is sandwiched between the holder lid 32a and body 31a when the lid 32a is attached to the body 31a, thereby holding the filter paper cup 40 against the holder lid 32a so that a needle inserted through the holder lid 32a will puncture the folding paper lid 40d and inject hot water into the filter paper cup 40. The brewing material 41 is preferably retained in the filter paper cup 40 solely by attaching a lid 32a of the pod holder 30r to the base 31a of the pod holder to sandwich the rim 40c of the filter paper cup 40 and the outer edge of the cover 40d between the lid of the pod holder to the base of the pod holder. U.S. patent application Ser. No. 11/777,831 filed Jul. 13, 2007 filed by the present inventor, describes a similarly pod holder. The '831 application is incorporated by reference above.

The inside diameter D4 of the mouth of the pod holder 30r is approximately the same size as the Diameter D2 of the filter paper cup 40 and is preferably approximately 1.625 inches, thereby facilitating the capture and sandwiching of the rim 40c and edge of the cover 40d between the holder lid 32a and body 31a. Sandwiching of the rim 40c and edge of the cover 40d between the holder lid 32a and body 31a both seals the brewing material in the filter paper cup 40 to prevent or restrict the escape of the brewing material from the filter paper cup 40 during brewing and provides a taut cover 40d facilitating puncturing the cover 40d by a needle used to inject heated water into the filter paper cup 40 during brewing. The body 31a may have a cylindrical or frusto-conical shape.

Another embodiment of the coffee holder 30s is shown in FIG. 82. The coffee holder 30a is similar to the coffee holder 30s but omits the tamping spring 36 and bottom tamper 34.

Functional diagrams of machines for manufacturing pods according to the present invention are shown in FIGS. 83A-82C. An important feature of the machines is that the filter paper cup 40 is preferably a heat seal filter paper and is first formed and overlapping pleats adhered by heat before the brewing material is added.

A preferred method for manufacturing the filter paper cups includes the following steps. Providing filter paper to a machine. Forming a receptacle in the filter paper. Using heat and/or steam make the filter paper retain the receptacle shape. Cutting out the receptacle and the lid. The following additional steps may be used to manufacture a pod according to the present invention. Filling the receptacle with brewing material. Tamping the brewing material in the receptacle. Positioning the lid over the receptacle. Attaching the lid to the receptacle. Nitrogen flushing and sealing the pod. Either the filter paper cups or the completed pods may be manufactured in a printing press or an assembly line style.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments described above may be mixed to provide new embodiments and such new embodiments are intended to come within the scope of the present invention.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material. Further, those skilled in the art will recognize that the features of the various embodiments of the present invention disclosed herein may be combined to provide various combinations. All of such combinations are intended to come with the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A holder for a single serving cartridge, the holder comprising:
   a holder base having a floor and walls and an open top for receiving the single serving cartridge;
   a holder lid attachable to close the open top of the holder base to form an assembled cartridge holder after receiving the single serving cartridge in the holder base, wherein the attached holder lid is configured to retain the single serving cartridge in the holder base and to allow entry of liquid into the cartridge holder through the holder lid;
   a holder interior defined by the floor and the walls of the holder base and the holder lid, the holder interior configured to contain a single serving of brewing material contained in the single serving cartridge when the single serving cartridge is retained in the holder;
   the assembled cartridge holder engagable with a coffee maker to make a serving of coffee, and the assembled cartridge holder dis-engagable from the coffee maker after each time the serving of coffee is prepared, and disassembleable after dis-engagement from the coffee maker to dispose of the used single serving cartridge and re-use the holder; and
   a readable identification feature fixed to the single serving cartridge and attached to the holder by retaining the single serving cartridge in the holder, the readable identification feature readable by the coffee maker whenever the assembled holder containing the single serving cartridge is engaged with the coffee maker; and
   the readable identification feature at least one of:
      a visual identification feature and the holder includes a window allowing a coffee maker to view the identification feature; and
      a sensed identification feature sensed by the coffee maker.

2. The holder of claim 1, wherein the identification feature is the visual identification feature and the holder includes the window allowing a coffee maker to view the identification feature.

3. The holder of claim 2, wherein the visual identification feature is a bar code and the holder includes a window allowing a coffee maker to view the identification feature.

4. The holder of claim 1, wherein the sensed identification feature is a magnetic strip.

5. The holder of claim 1, wherein the identification feature is a Radio Frequency Identification (RFID).

6. The holder of claim 1, wherein the single serving cartridge is constructed from filter material configured to release brewing drink through the filter material while retaining brewing material.

7. The holder of claim 1, wherein:
   the single serving cartridge is a disposable single serving cartridge; and
   the holder includes a bottom needle fixed to the floor of the holder and having a pointed end reaching vertically into the holder interior configured, the bottom needle to puncture the disposable single serving cartridge residing in the holder.

8. The holder of claim 7, wherein the holder includes a removable and reusable lid having a permanently open passage for a top needle to puncture and provide liquid to the disposable single serving cartridge.

9. The holder of claim 2, wherein the window is in the wall of the holder.

10. The holder of claim 3, wherein the window is in the wall of the holder.

11. The holder of claim 6, wherein the filter material is filter paper.

12. The holder of claim 1, wherein the single serving cartridge is retained in the holder by capturing a rim of the single serving cartridge between the holder lid and the holder base.

13. The holder of claim 1, wherein the readable identification feature is not readable by the coffee maker whenever the assembled holder containing the single serving cartridge is dis-engaged with the coffee maker.

14. An holder for a single serving cartridge, the holder comprising:
- a holder having a floor and walls and an open top for receiving the single serving cartridge;
- a holder lid attachable to close the open top of the holder base to form an assembled cartridge holder after receiving the single serving cartridge in the holder base, wherein the attached holder lid is configured to retain the single serving cartridge in the holder base and to allow entry of liquid into the cartridge holder through the holder lid;
- a holder interior defined by the floor and the walls of the holder base and the holder lid, the holder interior configured to contain a single serving of brewing material when the single serving cartridge is retained in the holder;
- the assembled cartridge holder engagable with a coffee maker to make a serving of coffee, and the assembled cartridge holder dis-engagable from the coffee maker after each time the serving of coffee is prepared, and disassembleable after dis-engagement from the coffee maker to dispose of the used single serving cartridge and re-use the holder;
- a bottom needle fixed to the floor of the holder interior and having a pointed end reaching vertically into the holder interior configured to puncture the single serving cartridge residing in the holder;
- a removable and reusable holder lid having a permanently open passage for a top needle to puncture and provide liquid to the single serving cartridge; and
- a coffee maker readable identification feature fixed to the single serving cartridge and attached to the holder by retaining the single serving cartridge in the holder, the readable identification feature readable by the coffee maker whenever the assembled holder containing the single serving cartridge is engaged with the coffee maker; and the readable identification feature at least one of:
  - a visual identification feature and the holder includes a window allowing a coffee maker to view the identification feature; and
  - a sensed identification feature sensed by the coffee maker.

15. A holder for a single serving cartridge the holder comprising:
- a holder base having a floor and walls and an open top for receiving the single serving cartridge;
- a holder lid attachable to close the open top of the holder base to form an assembled cartridge holder after receiving the single serving cartridge in the holder base, wherein the attached holder lid is configured to retain the single serving cartridge in the holder base and to allow entry of liquid into the cartridge holder through the holder lid;
- a holder interior defined by the floor and the walls of the holder base and the holder lid, the holder interior configured to contain a single serving of brewing material contained in the single serving cartridge when the single serving cartridge is retained in the holder;
- the assembled cartridge holder engagable with a coffee maker to make a serving of coffee, and the assembled cartridge holder dis-engagable from the coffee maker after each time the serving of coffee is prepared, and disassembleable after dis-engagement from the coffee maker to dispose of the used single serving cartridge and re-use the holder;
- a visually readable identification feature fixed to the single serving cartridge and attached to the holder by retaining the single serving cartridge in the holder, the visually readable identification feature readable by the coffee maker whenever the assembled holder containing the single serving cartridge is engaged with the coffee maker; and
- a window in the holder configured to allow a coffee maker to view the visually readable identification feature attached to the single serving cartridge residing in the holder.

16. The holder of claim 15, wherein the window is in the wall of the holder.

* * * * *